US009232768B2

(12) United States Patent
Knurr et al.

(10) Patent No.: US 9,232,768 B2
(45) Date of Patent: Jan. 12, 2016

(54) VOLUME BASED AUTOMATIC ANIMAL WATERING SYSTEM

(75) Inventors: Randal S. Knurr, Waterford, WI (US); Patrick G. Pieters, Burlington, WI (US); Russell F. Kuzniar, Elkhorn, WI (US); Paul S. Johnson, Muskego, WI (US)

(73) Assignee: Edstrom, Inc., Waterford, WI (US)

( * ) Notice: Subject to any disclaimer, the term of this patent is extended or adjusted under 35 U.S.C. 154(b) by 764 days.

(21) Appl. No.: 13/442,360

(22) Filed: Apr. 9, 2012

(65) Prior Publication Data

US 2013/0263794 A1 Oct. 10, 2013

(51) Int. Cl.
- *A01K 7/02* (2006.01)
- *A01K 1/03* (2006.01)
- *A01K 7/06* (2006.01)
- *A01K 1/035* (2006.01)

(52) U.S. Cl.
CPC ............... *A01K 1/031* (2013.01); *A01K 1/0356* (2013.01); *A01K 7/02* (2013.01); *A01K 7/06* (2013.01)

(58) Field of Classification Search
CPC ......... A01K 1/03; A01K 1/031; A01K 39/02; A01K 39/04; A01K 7/02
USPC ......... 119/454–457, 475, 72.5, 476; 137/263, 137/266
See application file for complete search history.

(56) References Cited

U.S. PATENT DOCUMENTS

| | | | |
|---|---|---|---|
| 2,701,547 A * | 2/1955 | Shaw ............................ | 119/458 |
| 3,159,139 A * | 12/1964 | Haggard et al. ............. | 119/457 |
| 3,285,226 A * | 11/1966 | Schuler ........................ | 119/457 |
| 3,536,102 A | 10/1970 | Ahehitz et al. | |
| 4,470,374 A * | 9/1984 | Upperman ..................... | 119/72 |
| 4,480,588 A * | 11/1984 | Holladay et al. .............. | 119/455 |
| 5,042,429 A | 8/1991 | Deitrich et al. | |
| 5,337,696 A | 8/1994 | Edstrom et al. | |
| 6,293,229 B1 | 9/2001 | Edstrom, Sr. | |
| 6,418,961 B1 | 7/2002 | Edstrom, Sr. | |
| 6,463,879 B1 | 10/2002 | Campbell et al. | |
| 6,910,532 B2 | 6/2005 | Meyers et al. | |
| 7,108,015 B2 | 9/2006 | Lombari et al. | |
| 7,353,845 B2 | 4/2008 | Underwood et al. | |
| 7,387,083 B2 | 6/2008 | Nardine, III et al. | |
| 7,866,280 B2 | 1/2011 | Gabriel et al. | |
| 2007/0125307 A1* | 6/2007 | Nardine et al. ................. | 119/72 |
| 2010/0126588 A1 | 5/2010 | Jeanrot | |
| 2010/0175629 A1 | 7/2010 | Garmon | |

OTHER PUBLICATIONS

Biberon Serenium Brochure.

* cited by examiner

*Primary Examiner* — Rob Swiatek
*Assistant Examiner* — Danielle Clerkley
(74) *Attorney, Agent, or Firm* — Boyle Fredrickson, S.C.

(57) ABSTRACT

An automatic animal watering system has a manifold for transporting drinking water, a controlled volume dispenser in the manifold for receiving a volume of drinking water, an inlet valve, and an outlet valve. A plurality of drinking valve assemblies is provided in fluid communication with the manifold between the inlet and outlet valves. A fluid sensor, capable of responding to changes in one or both of the water volume and pressure, is provided in the manifold between the inlet and outlet valves. The volume of drinking water available to the drinking valve assemblies can be regulated as a function of time to limit maximum potential leakage. The system also includes a controller receiving signals from the fluid sensor and generating a response to changes in the monitored water volume or pressure, thereby limiting potential water leakage in the system.

16 Claims, 15 Drawing Sheets

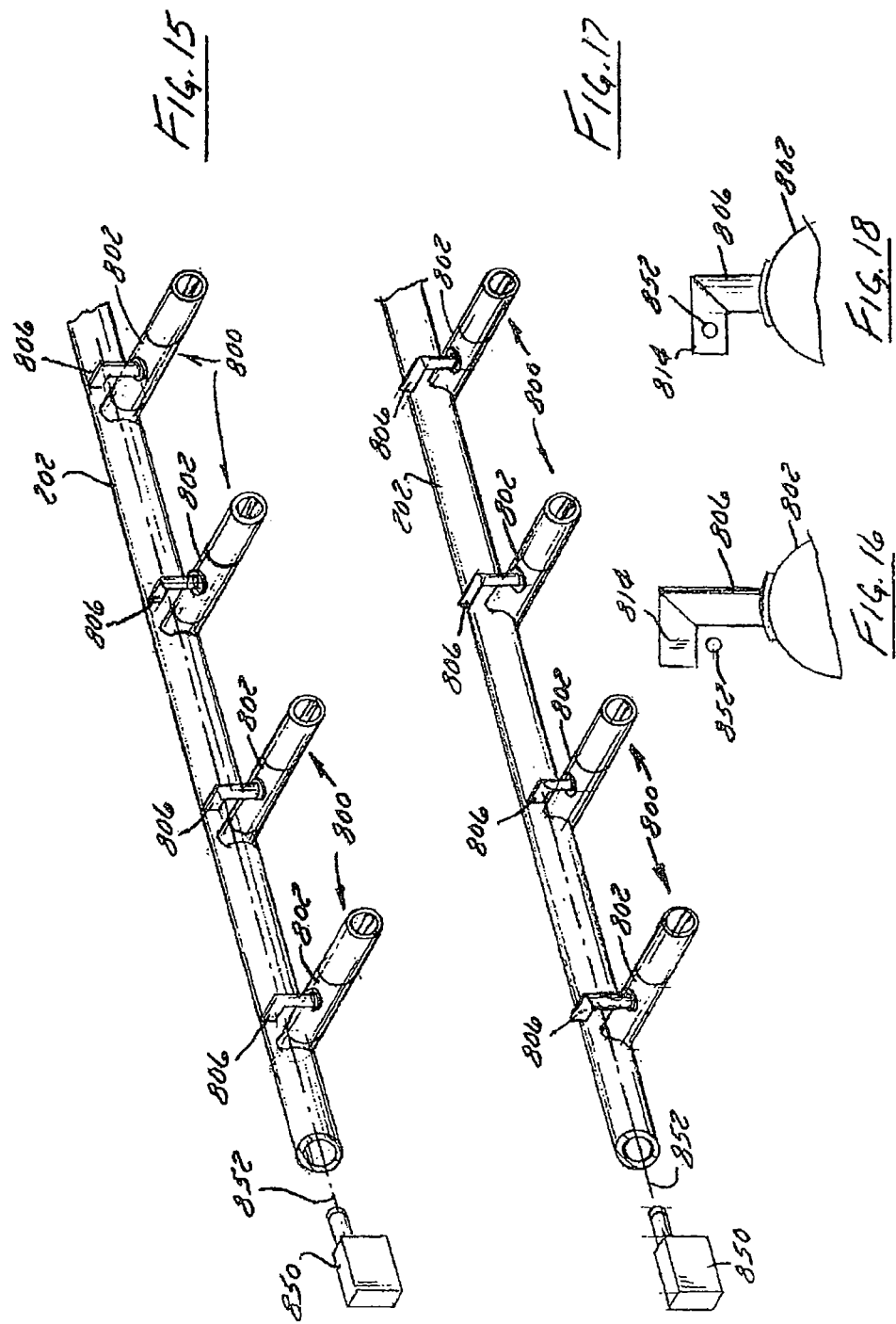

VOLUME BASED AUTOMATIC ANIMAL WATERING SYSTEM

BACKGROUND OF THE INVENTION

1. Field of the Invention

The invention relates generally to an automatic animal watering system, and more particularly, relates to an automatic animal watering system providing a controlled volume of drinking water to animal cages. The invention additionally relates to a method of operating such a system.

2. Discussion of the Related Art

Providing drinking water to caged animals, particularly in laboratories and other facilities having hundreds or thousands of cages, faces many unique challenges that are not otherwise confronted when watering animals. Due to the complexity and size of modern facilities, large populations of test animals are often required. These test animals typically include small mammals such as mice or rats, but may also include larger test animals. Isolating one or more test animals in a confined cage is often required to prevent comingling of the entire test population and to control experimental variables. To conserve space as well as to provide easy access and visual inspection, these cages are often stored in elongated rows, which are stacked upon one another to form a rack of cages. The individual cages within the rack must each be supplied with water for test animal drinking.

Drinking water is supplied to the caged animals via animal-operated drinking valves. The typical drinking valve includes a stem that dispenses water when the stem is deflected by an animal. The valves may receive water from bottles or bags located within the cage or via manifolds that receive water from a central source of an integrated automated watering system. Manifolds typically are preferred in larger facilities because the monitoring and refilling of individual bottles is time consuming, particularly with large test populations.

However, automated water systems, like any closed system, are susceptible to forming leaks. Any such leak may result in the flooding of one or more cages on a rack at the risk of the well-being of the animal or animals housed therein and potentially jeopardizing the associated research.

Additionally, as these conventional automated water systems combine individual drinking valves with a plumbing system connected to a single high-volume water source, there is often no mechanism for isolating the water supply, and attendant risk of leaks, to less than all of the cages mounted on a particular rack. It is likewise impossible to determine where such a leak is located within the rack. This concern is particularly significant in situations in which the volume of water supplied to each individual drinking valve must be limited due to 1) a desire to minimize the potential harm by reducing leakage at any location to a set volume, 2) the constraints of a given experiment requiring limited water distribution to each cage, and/or 3) a desire to determine the rate of water consumption per cage. Prior systems also typically were incapable of monitoring water flow to individual cages or rows of cages without employing other monitors, such as flow meters or cameras, hence reducing the capability of such systems to monitor and control the water supply to individual cages or rows of cages.

Thus, despite prior attempts to design an automatic animal water system, there remains need for improvement.

For example, there is a need to mitigate the potential harmful effects of a leak at a given rack or a given location on a rack by quickly identifying and isolating the location of the leak while maintaining water supply to at least part of the remainder of the racks or remainder of locations on an individual rack.

There is also a need to permit monitoring and control of the volume of water supplied to individual cages or to at least an easily monitorable group of cages, such as the cages on one row of a rack, or even supplied to a rack.

SUMMARY OF THE INVENTION

One or more of the above-identified needs are met by providing a manifold-based automatic animal watering system having volumetric-based water usage monitoring and/or control capability at any or all of the rack level, the row level, and the cage level. The watering system has a manifold for transporting drinking water to animals housed in cages. The manifold contains at least one controlled volume dispenser for receiving a volume of drinking water, an inlet valve in fluid communication with the controlled volume dispenser, and an outlet valve in fluid communication with the controlled volume dispenser. A plurality of drinking valve assemblies are provided in fluid communication with rows of the manifold between the inlet and outlet valves. A fluid sensor capable of responding to changes in one or both of the water volume and pressure may be provided in the manifold between the inlet and outlet valves. The controlled volume dispenser and associated valves may comprise one or more of an accumulator, a screen or other flow restrictor, and a controlled volume delivery pump, and may be provided at the rack level, the row level, and/or the valve level. The valve may be separated from or physically or conceptually integrated with the controlled volume dispenser.

The system may also include one or more controllers or ECUs receiving signals from the fluid sensor and generating a response to changes in the monitored water volume and/or pressure. The responses may include signaling an alarm, interrupting an automatic charging cycle, and/or triggering one or more valves as to limit leakage in the system. The watering system is ideally suited for use with animal cages, but is usable with other animal watering applications as well.

The controlled volume dispenser and associated inlet and outlet valves may be provided at the cage level, the row level, the rack level, or any combination thereof.

For example, in accordance with another aspect of the invention, the water supply system may include a separate controlled volume dispenser and associated valves for supplying water to each of a plurality of rows. Instead of or in addition to this arrangement, a controlled volume dispenser and its associated inlet valve could be provided in the inlet portion of the manifold upstream of the first row on a rack, and the associated outlet valve could be provided downstream of the last row on the rack.

In accordance with yet another aspect, each drinking valve may have a dedicated controlled volume dispenser associated therewith. The dedicated controlled volume dispenser may be formed integrally within the valve or may be located adjacent an inlet of the valve. The valve and/or its associated controlled volume dispenser may also have a fluid sensor capable of responding to changes in either the water volume and/or pressure within the controlled volume dispenser of the drinking valve.

In accordance with still another aspect of the invention, water usage at the valve, row, and/or rack level may be monitored over time and the results used to monitor the drinking habits of animals and/or to control the flow of water through the system. Time-based measurement, in combination with controlled volume dispensers, also permit volume and/or pressure decay rates to be monitored and controlled. For example, once a system is charged and the controlled volume dispenser(s) and associated components are isolated from the system's supply and drain, water consumption can be monitored over time to determine whether water consumption exceeds or falls beneath expected volumes.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention is illustrated in the accompanying drawings in which like reference numerals represent like parts throughout, and in which:

FIG. 15 is a perspective view of another embodiment of a row-based watering subassembly including the valve-based water supply subassembly of FIG. 14, with a plurality of volume indicators in an extended position;

FIG. 16 is a side elevation of a portion of one of the drinking valve assemblies of FIG. 15 that contains one of the indicators and showing the indicator in an extended position;

FIG. 17 is a perspective view showing the row-based watering subassembly of FIG. 15, showing one of the volume indicators in a retracted position;

FIG. 19 is a graph illustrating hourly water consumption of an animal consuming water from the water supply system of FIG. 1.

DETAILED DESCRIPTION OF THE PREFERRED EMBODIMENT

A wide variety of automatic animal watering systems could be constructed in accordance with the invention as defined by the claims. Hence, while the preferred embodiments of the invention will now be described with reference to use with caged animals, it should be understood that the invention is in no way so limited.

1. System Overview

Figure 1:
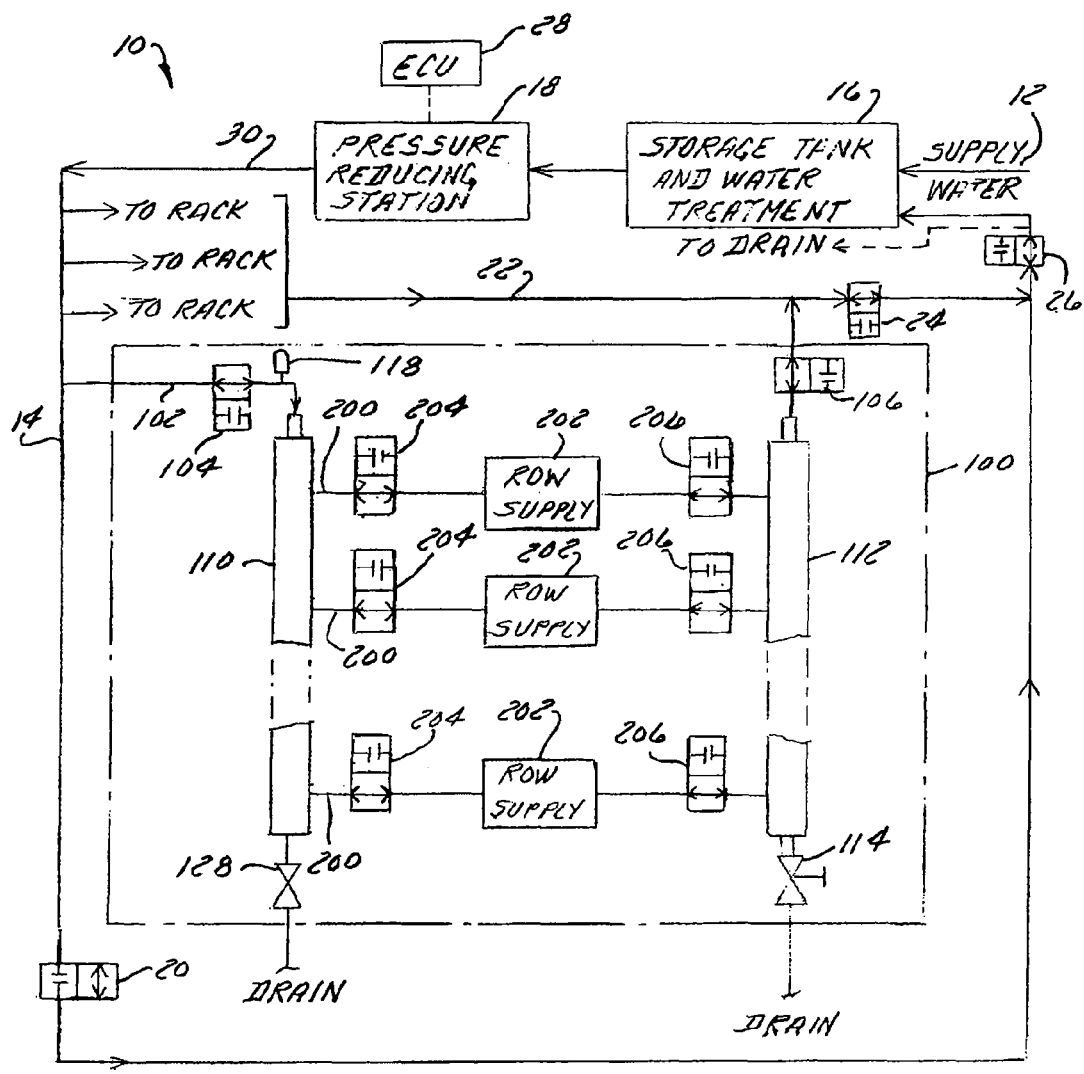
FIG. 1 is a schematic illustration of a facility-based water supply system incorporating rack, row, and valve-based water supply systems and components constructed in accordance with an embodiment of the invention.
Figure 2:
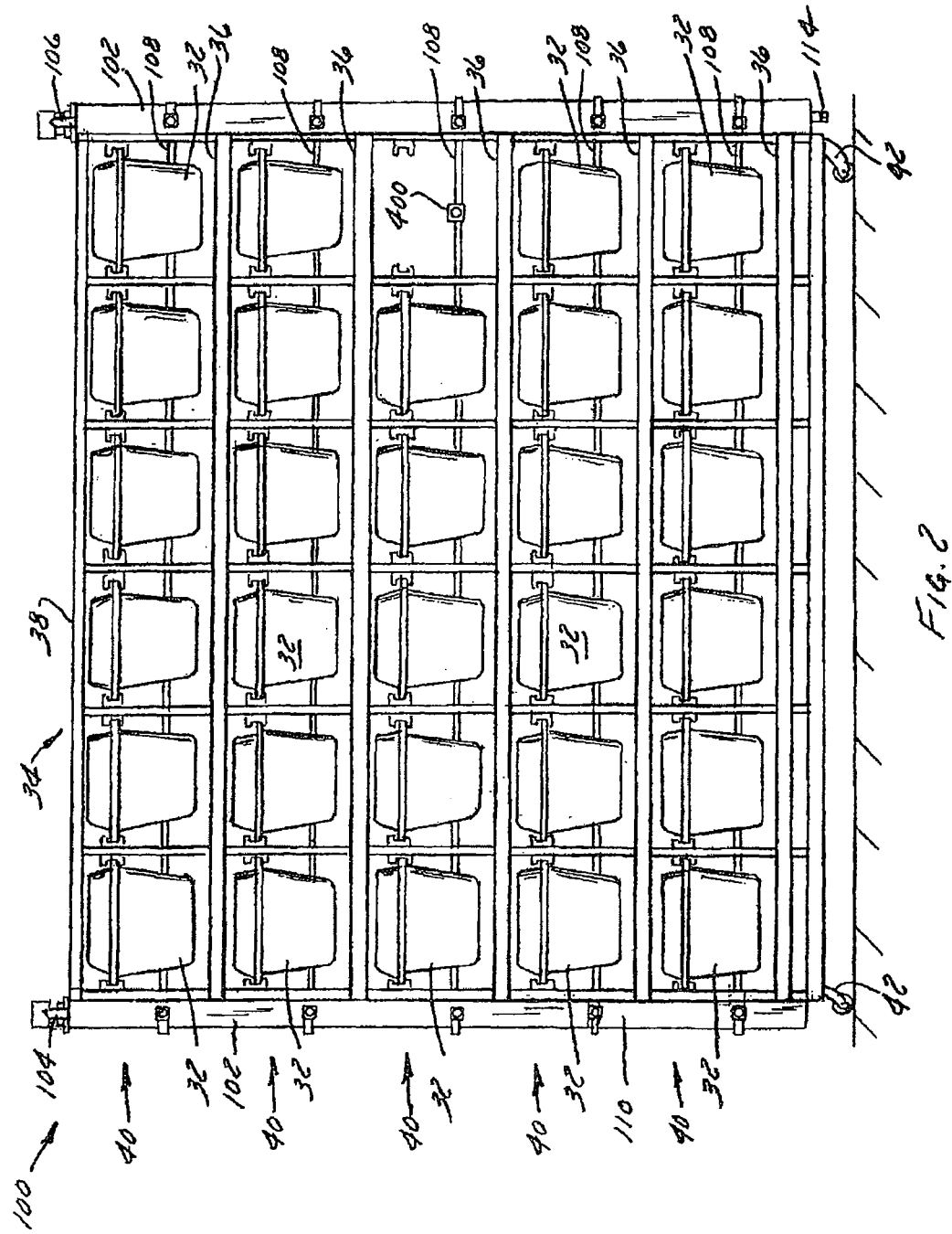
FIG. 2 is a side elevation view of a cage and rack system supplied with water via the water supply system of FIG. 1.

FIGS. 1 and 2 illustrate the water supply system 10 in accordance with the invention. FIG. 1 shows a schematic view of a water supply system 10 for supplying water to a plurality of cage and rack systems. The racks may be located in one or more rooms of a facility such as a university or a private research lab. The water supply system 10 may include a number of subsystems, each of which may include one or more water supply assemblies and their associated drinking valve assemblies. Purely in order to simplify discussion, the following terms will be used herein:

A "drinking valve assembly" is a device or assembly that can be actuated by an animal to supply water to the animal. Some, but by no means all, drinking valve assemblies usable in the water supply system are illustrated in FIGS. 8-14 below and the accompanying disclosure.

A "controlled volume dispenser" is any device or combination of devices that is capable of dispensing a given volume of water on demand or upon a given condition or set of conditions being set. Non-limiting examples of controlled volume dispensers include accumulators and controlled volume dispensing pumps. A screen, orifice, or other restrictor acting in conjunction with on-off valves can also form a controlled volume dispenser.

A "water supply assembly" or "row supply system" is a portion of the water supply system that supplies water to a plurality of grouped drinking valve assemblies. In the most typical arrangement, this portion of the system supplies water to some or all of the drinking valve assemblies associated with a given row of a cage and rack system. Exemplary water supply assemblies usable in the water supply system disclosed herein are described in FIGS. 4-7D and the accompanying disclosure.

A "water supply subsystem" or "rack supply system" is a portion of a water supply system that supplies water to multiple water supply assemblies, most typically all water supply assemblies, associated with a given rack. The water supply assemblies associated with a given water supply subsystem, such as the drinking valve assemblies associated with a given row of a water manifold, form part of the associated water supply system. Exemplary water supply subsystems usable in the water supply system disclosed herein are described in FIGS. 1-3A and the accompanying disclosure.

A "water supply system" or "room distribution system" supplies water to at least one, and most typically a plurality of, water supply subsystems in a given room or other defined area within a facility.

Still referring to FIG. 1, the water supply system 10 of this embodiment receives water from a source such as a municipal water supply as illustrated schematically by line 12 and outputs water to a plurality of water supply subsystems (one of which is shown at 100) via a main supply line 14. In addition to the various water supply subsystems 100 and its associated components, the water supply system 10 may include a storage tank and repressurization pump/tank sub system 16, a pressure reducing station 18 or "PRS" that provides conditioned water to the remainder of the system 10 at a desired pressure, and a room distribution supply valve 20 or "RDS" valve when supply line 14 is part of a flushing type system. The storage and repressurization tank sub system 16 is designed to hold a sufficient volume of water to supply the entire system 10 with water for a significant period of time, such as 24-72 hours, and may include or be associated with any of a variety of filtration and/or other water treatment devices, such as a UV treatment device, that remove impurities from the incoming water. Typically, such devices will be located within, immediately upstream, and/or downstream of the tank sub system 16. Alternatively, the system may be a recirculation type system of which the tank sub system 16 may only include a storage tank and distribution pump and eliminate PRS 18 and RDS valve 20 for supplying water to the main supply line 14. The water supply system also has a main return line 22 for receiving flushed, overflow, and/or unused water from the plurality of water supply subsystems 100. The main return line includes a room distribution return valve 24 or "RDR" valve and a control valve 26.

In the repressurization type supply system the pressure reducing station 18 or "PRS" receives treated water from the tank subsystem 16 at a relatively high pressure, typically in excess of 30 psi and outputs water at a low pressure of on the order of 1-7 psi, at least in the typical case in which the system 10 supplies water to drinking valve assemblies that supply water to lab animals such as mice or rats. PRS 18 may include a high pressure regulator that outputs water at a high pressure of on the order of 10-25 psi and a high pressure control valve in parallel with a low pressure regulator. The high pressure control valve may be electronically controlled under feedback from a pressure sensor located within the PRS 18 and/or logic from within the electronic control unit ECU or 28. The PRS 18 may include a flow monitor to determine whether or not water is flowing correctly through the PRS based on the state of the supply system as it provides water to manifold 14.

Still referring to FIG. 1, the RDS valve 20 may be any one of a number of valves that selectively 1) prevents water flow therethrough so as to maintain pressure in the main supply line 14 and 2) permits water flow therethrough to permit depressurization of the main supply line 14. The outlet of this RDS valve 20 may be connected to a drain or to the storage tank of tank sub system 16. The RDS valve 20 could even be multiple valves or a three-way valve capable of delivering water to either the storage tank 16 or to drain, depending on the position of the valve. The RDS valve 20 preferably is an electronically controlled valve that is controlled by an electronic controller unit 28 or "ECU" that may be the same or different ECU 28 controlling the pressure reducing station 18 and/or other components of the system 10. Hence, while reference will be made at various points herein to a "controller 28" or "ECU 28", it should be understood that the controller could be a master controller or one or more of a number of interconnected or stand-alone controllers controlling water flow through the system. Alternatively, the RDS valve 20 could be a manually controlled valve. Preferably, the RDS valve 20 also includes an internal or separate check valve that prevents water back flow through the main supply line 14 when the outlet of the RDS valve 20 is connected to the drain or to the storage tank of tank subsystem 16.

Still referring to FIG. 1, the RDS valve 20 preferably is controlled so as to be normally closed in a flushing type system along with the high pressure control valve in the PRS 18, holding the supply line 14 at low pressure to allow monitoring of the system for possible leaks by the PRS 18 when there should be no flow from the supply line 14. Specifically, at the beginning of a flush/charge cycle, the PRS 18 outputs water into the water supply system 10, with the high pressure control valve in the PRS open and the RDS valve 20 closed to hold water within the manifold 30 at the higher pressure to flush/charge the water supply subsystems 100. At the completion of this "charge" part of the cycle, the high pressure control valve in the PRS is closed, the RDS valve 20 is opened to reduce water pressure in the manifold 30, and returns excess water in the main supply line 14 to either the drain or to the storage tank 16. By opening the RDS valve 20 at the end of the flush or charge cycle and draining water from the main supply line 14, water volume in excess of the preselected volume is prevented from entering the drinking valve assemblies.

Similarly, in a recirculation type supply system and/or in a repressurization type supply system, the RDR valve 24 located in the main return line 22 may be any of a number of valves that selectively 1) prevents water flow therethrough so as to maintain pressure in the upstream portions of the main return line 22 and 2) permits water flow therethrough. The outlet of the RDR valve 24 may be connected to a drain or to the storage tank 16. The RDR valve 24 could even be a three-way valve capable of delivering water to either the storage tank 16 or to drain, depending on the position of the valve. The RDR valve 24 preferably is an electronically controlled valve that is controlled by an ECU that may be the same or different ECU 28 controlling the pressure reducing station 18 of a repressurization type supply system and/or other components of the system 10. Alternatively, the RDR valve 24 could be a manually controlled valve. Preferably, the RDR valve 24 may include an internal or external check valve that prevents water back flow through the main return line 22 of the manifold 30. When the PRS 18 or the recirculation pump outputs water into the water supply system 10 to flush or charge the system, the RDR valve 24 may be closed to hold water within the manifold 30. At the completion of the flush or charge cycle, the RDR valve 24 may open to reduce water pressure in the manifold 30 and return water in the main return line 22 to either the drain or to the storage tank 16.

The control valve 26 functions the same as RDR valve 24 but illustrates that multiple RDR valves can be replaced by one control valve 26 to control the return manifold of the entire system.

2. Rack Supply System

Figure 3:
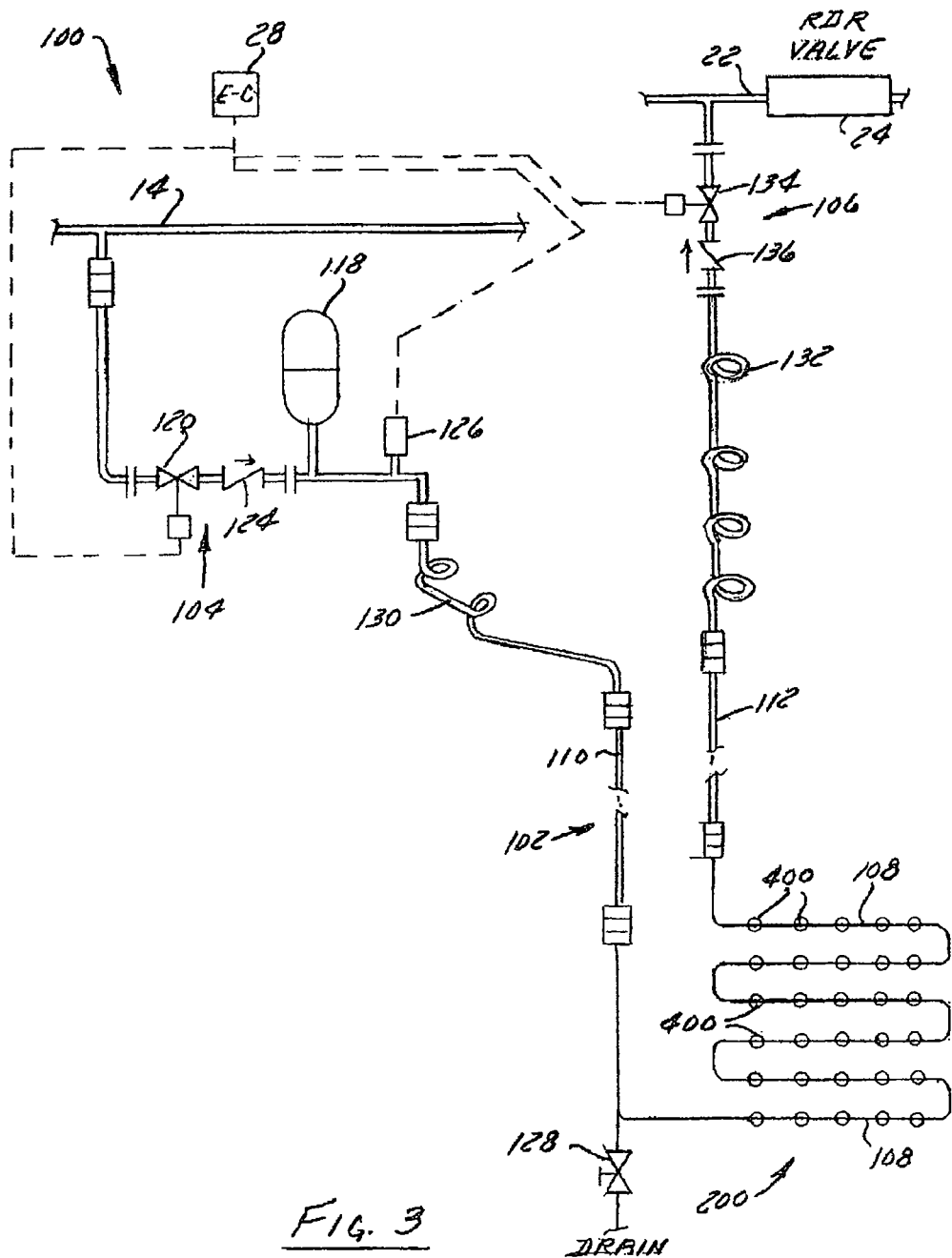
FIG. 3 is a schematic illustration of an embodiment of a rack-level water supply assembly usable in the water supply system of FIG. 1.

Referring now to FIGS. 1-3 and initially to FIGS. 1 and 2, each water supply subsystem 100 or rack supply system 100 of this embodiment is designed to supply water to all of the animals housed in all of the cages 32 on a rack 34. Referring especially to FIG. 2, the rack 34 includes a self contained device comprising a number of vertically spaced shelves 36 mounted on a common frame 38. Each shelf 36 bears a row 40 of cages 32. While FIG. 2 illustrates a rack 34 consisting of five rows 40 having six cages 32 on each row, any number of rows and cages are considered within the scope of this invention. Indeed, the most typical system on the market today has ten (10) rows 40 with sixteen (16) cages 32 on each row 40 and thus supports one hundred and sixty (160) cages 32. The rack 34 may also be placed on castors 42 or wheels to allow the rack 34 to be moved and relocated throughout a laboratory or other facility. The mobility of the rack 34 facilitates use of the system 10 with different room configurations and also facilitates the use of multiple racks 34 in a single water supply system 10, thereby limiting the need for plumbing an entire laboratory.

Referring to FIGS. 1, 2, 3 and 3A, a water manifold 102 is provided in the rack supply system 100 for supplying water to the individual cages 32 on a rack 34. The manifold 102 has a rack inlet valve 104 at one end and a rack outlet valve 106 on an opposing end. The manifold 102 includes a plurality of rows 108 aligned with the rear walls of cages 32 on each of the rows 40 on the rack 34. The rows 108 of the rack supply system 100 may be connected to one another in a serpentine manner as illustrated schematically in FIG. 3, or may be coupled to a common supply line 110 and return line 112 of the rack manifold 102 as shown schematically in FIG. 1. A plurality of drinking valve assemblies 400, each of which is associated with a respective cage, is provided in each row 108. Referring to FIGS. 1 and 2, the manifold 102 further comprises a drain valve 114 located at a low point in the rack manifold downstream of the rows 108 and capable of draining any water contained within the manifold 102 return line 112 via gravity. The drain valve 114 is preferably, but not necessarily, manually activated.

Still referring to FIG. 1, the manifold 102 associated with each rack 34 includes a rack valve assembly comprising a rack inlet valve 104 and a rack outlet valve 106. The valves 104, 106 may be controlled either electronically, mechanically, or manually, as described in more detail below in conjunction with FIGS. 3 and 3A. A rack level controlled volume dispenser such as a screen or controlled volume pump or, in this particular embodiment, a rack accumulator 118 is located downstream of the rack inlet valve 104 and is configured to store a volume of drinking water therein from the PRS 18 of the water supply system 10. The rack accumulator 118 stores a sufficient volume of water at a rated pressure (typically 3-20 psi) to charge the remainder of the subsystem 100 and individual row supply systems 200. That volume of water in a rack accumulator is preferably typically between 1000 ml and 10,000 ml and more preferably between 1500 ml and 2000 ml for a 160 cage rack with 5 mice per cage and charging cycles every 4 hours. This volume will vary with factors such as time between recharges and the size of the rack. Each of the individual assemblies 200 of FIG. 1, which are downstream of the rack accumulator 118, contains an individual row inlet valve 204 and row outlet valve 206 disposed on either side of a row 108. It should be noted that, depending on the type of controlled volume dispenser that is employed and the location of the controlled volume dispenser in the system, one or both of the inlet valve and/or the outlet valve could be integrated into the controlled volume dispenser. For example, check valve(s) serving as an inlet valve and/or an outlet valve could be integrated into a controlled volume pump, either as valve(s) within the pump assembly or as inherent functionality of the pumping mechanism(s).

As discussed above, water flow through the water supply subsystem 100 is controlled by actuation of one or more valves to 1) flush the system 10 and 100 2) charge the accumulator 118, and/or 3) respond to leaks or other alarm situations. This control may be effected manually, electronically, mechanically, or a combination of two or more of these. Examples of such controls and of the associated subsystem components now will be described.

Turning first to FIG. 3, a rack supply system 100 is illustrated in which the water flow therethrough is controlled electronically, at least in part. The rack supply system 100 includes a solenoid controlled water supply control valve 120, i.e. solenoid valve, which is activated via an ECU, and a backflow preventing check valve 124. ECU may be the same ECU 28 of FIG. 1 that controls the water supply system 10 or a different ECU. The check valve 124 is a one-way valve which allows water to enter the rack supply system manifold 102, but prevents backflow through the water supply control valve 120. Of course, it may be possible for the water supply control valve 120 to perform both water supply and backflow prevention functions, thereby eliminating the need for a separate check valve 124. When the ECU 28 signals the solenoid controlled water supply control valve 120 to open, such as during a flushing or charging cycle, water flows from the PRS 18, through the main supply line 14 through the water supply control valve 120 and the check valve 124, and into the rack manifold 102. If multiple rack supply systems 100 are attached to the water supply system 10, the ECU 28 may activate the appropriate water supply control valve(s) 120 to flush or charge each rack supply system 100 independently or in combination with the other rack supply systems 100.

As the water enters the rack manifold 102, it subsequently flows into the rack accumulator 118, which may be connected to the rack manifold 102 via a tee as shown or which may be an in-line accumulator 118. The rack accumulator 118 of FIG. 3 may be, for example, a spring force accumulator or a pressurized accumulator having an air or gas charge. Regardless of its construction, the rack accumulator 118 has an internal chamber that is capable of expanding when receiving pressurized water from the PRS 18 during flushing and/or charging cycles. Through the compression of either the accumulator's spring or air/gas charge, the internal volume of the rack accumulator 118 expands and stores a sufficient volume of water at a rated pressure (typically 3-20 psi) to charge the remainder of the subsystem 100 and individual row supply systems 200. Preferably, the rack accumulator 118 is designed to hold a sufficient volume of water to supply the rack supply system 100 and its row supply systems 200 with water for a significant period of time, such as 4-24 hours. This volume is typically between 1000 ml. and 10,000 ml. and even more typically between 1500 ml and 2000 ml in the case of a rack supply system designed to supply water to a 160 cage rack for four hours. This limited availability of water will eliminate the potential for uncontrolled leaks in the system by limiting the available water to the rack supply system 100.

The water pressure in the rack accumulator 118, and thereby rack manifold 102, is monitored by a rack fluid sensor 126 disposed in the rack manifold 102 adjacent the rack accumulator 118. The rack fluid sensor 126 generates a signal indicating the fluid pressure level in the accumulator 118 and associated portions of the rack manifold 102. The pressure level signal is then transmitted to the ECU 28. If the signal received at the ECU 28 indicates abnormal water pressure in the rack accumulator 118, an alarm and/or a response may be triggered by the ECU 28. If the abnormal signal is indicative of a leak, the response may include suspending recharge or flush and charge cycles through the rack supply system 100 until the leak is identified and repaired. Instead of or in addition to responding in this manner, the response may include effecting periodic short charge cycles to provide water to the rack and, and then rechecking to observe if the abnormal flow condition still exists. Alternatively, the response may include draining the rack supply system 100 by opening the drain valves 128, 114 located in the supply line 110 and return lines 112 of the rack manifold 102, as described in further detail below, and/or by opening the rack outlet valve 106.

The pressurized drinking water contained within the rack accumulator 118 is supplied to the row supply system 200 via the supply line 110 of the rack manifold 102, possibly via a recoil hose 130. A drain valve 128, located in the lowest point of the supply line 110 upstream of the row supply systems 200, allows the upstream portion of the rack manifold 102 to be fully drained on demand. The drain valve 128 may be electronically controlled by the ECU 28, or manually controlled as seen in FIG. 3.

Figure 4:
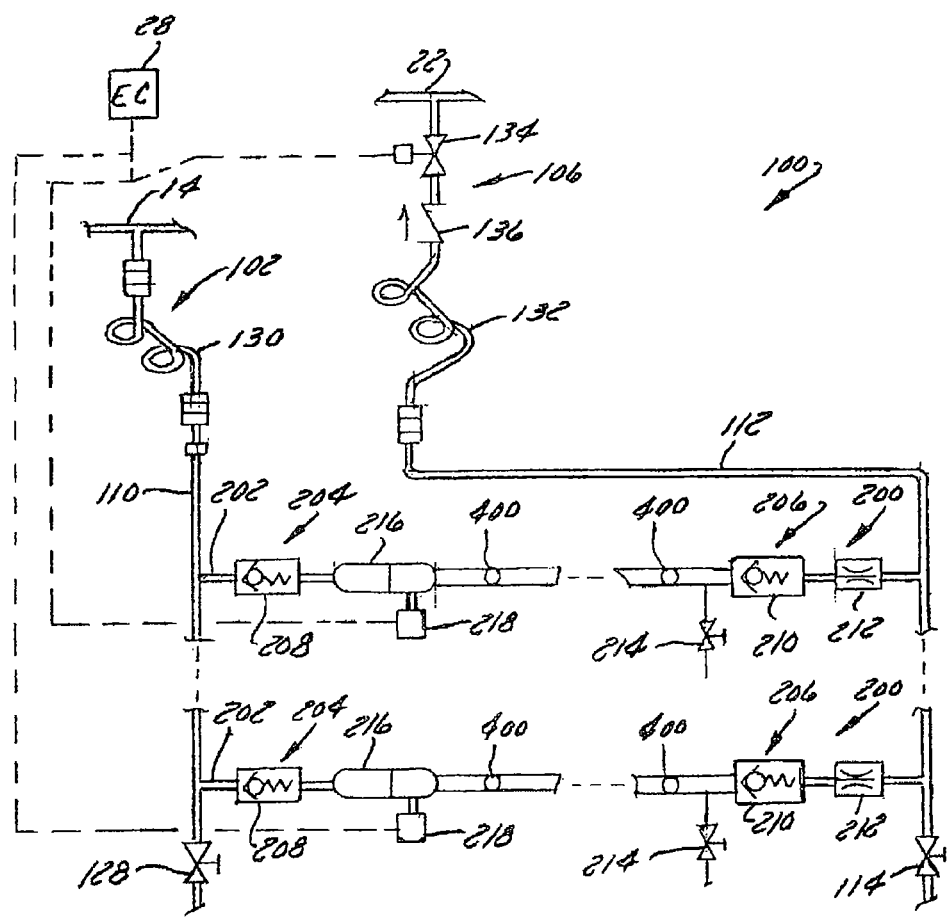
FIG. 4 is a schematic illustration of a row-level water supply subassembly usable in the water supply system of FIG. 1.

Upon exiting the row supply systems 200, unused or flushed water from the various assemblies 200 is combined in the return line 112 of the rack manifold 102. A drain valve 114 is located in the lowest point of the return line 112 downstream of the row supply systems 200. When opened, this drain valve 114 allows the downstream portion of the rack manifold 102 to be fully drained. The drain valve 114 may be electronically controlled by the ECU 28, or manually controlled as seen in FIGS. 1 and 4. When the drain valve 114 is closed, the water bypassing drain valve 114 flows to the rack outlet valve 106, possibly via a recoil hose 132.

The rack outlet valve 106 may comprise an electronically controlled water flush valve 134, i.e. a solenoid valve, which is activated via the ECU 28. It may be accompanied by or include an internal or external check valve 136 that allows water to enter the return line 22 of the water supply system manifold 30 but that prevents backflow into the row supply systems 200. When the ECU 28 activates the solenoid controlled water flush valve 134 to open, such as during a flushing or charging cycle, water flows from the row supply systems 200, through the return line 112 of the rack manifold 102, and into the main return line 22 of the water supply system 10. At the end of the flushing or charging cycle, the ECU 28 closes the solenoid controlled water flush valve 134, thereby filling the upstream manifold 102 with drinking water.

Figure 3A:
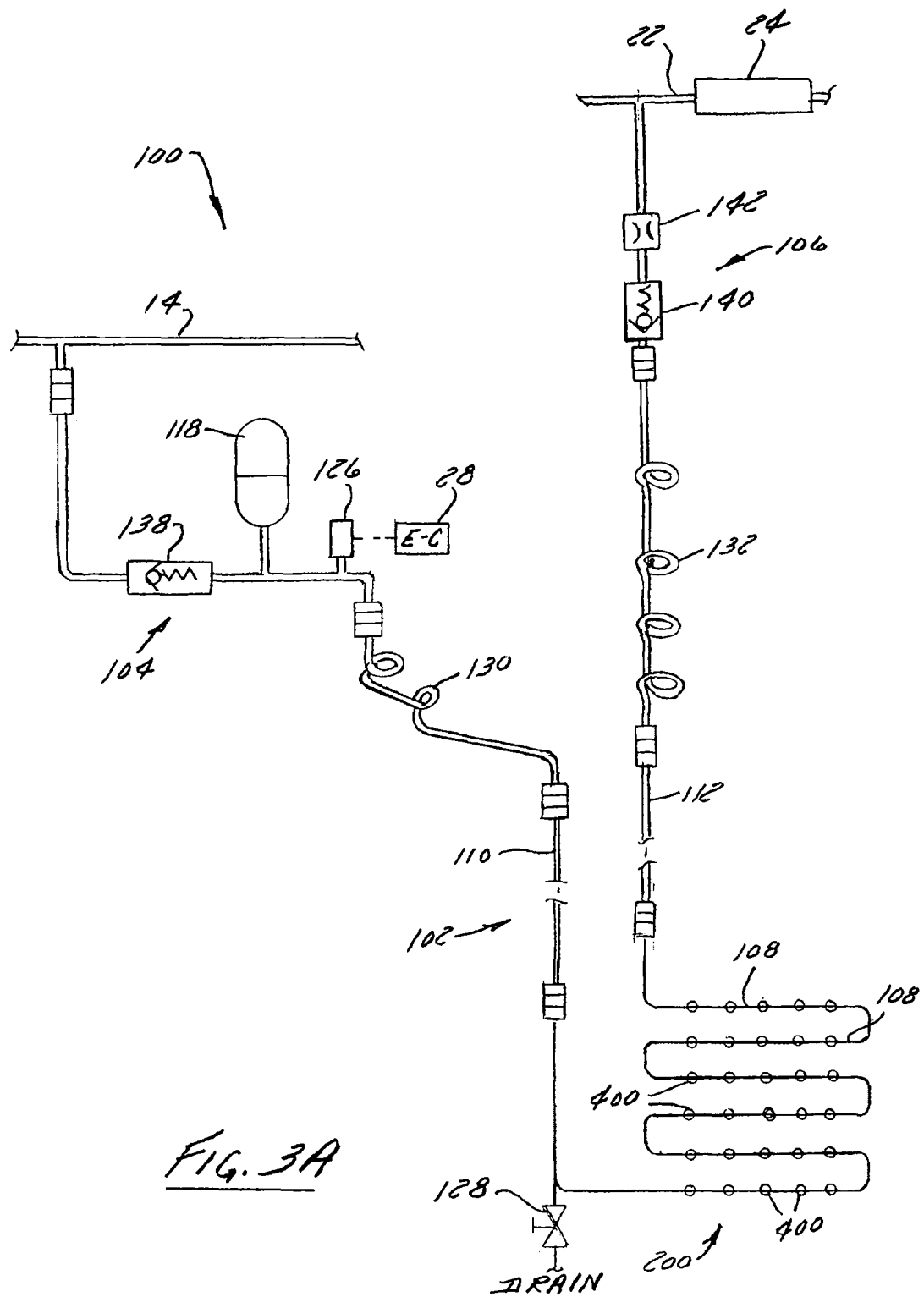
FIG. 3A is a schematic illustration of an alternative preferred embodiment of the rack-level water supply assembly of FIG. 3.

Turning now to FIG. 3A, an alternative embodiment of the rack supply system 100 of FIG. 3 is illustrated in which the rack inlet and outlet valves 104, 106 are mechanically controlled, rather than electronically controlled. In FIG. 3A, the rack accumulator 118, rack fluid sensor 126, and rack manifold 102 remain consistent with those disclosed in FIG. 3.

Specifically, the rack inlet valve of FIG. 3A is a spring loaded check valve 138 that allows water to enter the rack supply system manifold 102, i.e. rack manifold, but prevents backflow therethrough. The valve 138 allows water to enter the rack manifold 102 when the pressure of water supplied from the PRS 18 via the main supply line 14, such as during a flushing or charging cycle, is sufficiently high in force to overcome the biasing spring force. The fluid pressure required to overcome the biasing force of the spring typically is between 5 psi and 10 psi and more preferably between 8 psi and 10 psi. Once enough water has entered the rack manifold to fill the rack accumulator 118 and assemblies 200, the PRS 18 will stop the flow of high pressurized water, and the spring loaded rack inlet valve 138 will bias into the closed position.

The rack outlet valve of FIG. 3A, located in the return line 112 of the rack manifold 102, also includes a spring loaded flush valve 140 that allows water to exit the rack manifold 102 when the water pressure exiting the assemblies 200 is sufficiently high to overcome the biasing force of the spring. For example, When the ECU 28 controls the PRS 18 to flush water through the system at high pressure, water flows from water supply system 10, through the assemblies 200, and into the return line 112 of the rack manifold 102, where it has sufficient water pressure to open the spring loaded flush valve 140. A flow control orifice 142 may be provided immediately downstream or upstream or integral to the spring loaded flush valve 140 to restrict the flow rate of water therethrough during a flush operation. This flow control orifice 142 permits a balanced flush when more than one rack system 100 is being flushed/charged at the same time, and the orifice 212 in each row on the racks maintains balanced flow through all rows on the racks. During the completion of a charging cycle, the spring-loaded flush valve 140 will close before spring-loaded check valve 138, thereby allowing a pressurized volume of water to fill the rack supply system 100 and row supply systems 200. The charge cycle ends as a result of PRS 18 shifting to low pressure through closing the high pressure control valve or by opening the control valve 20, resulting in the pressure being lowered in the supply manifold 14. In addition, the control valves 24 and 26 may be used to insure a complete charge of the highest-available water pressure. The closing of the spring loaded flush valve 140 prior to the spring loaded check valve 138 may be a result of a relatively higher spring constant in the spring loaded flush valve 140.

Once charged with water, the rack accumulator 118 of FIG. 3A will operate in a manner as previously discussed in FIG. 3. The water pressure in the rack accumulator 118, and thereby rack manifold 102, is monitored via a rack fluid sensors 126. The rack fluid sensor 126 of FIG. 3A is disposed in the rack manifold 102, which is in fluid communication with the interior of the rack accumulator 118. The rack fluid sensor 126 generates a signal indicating the fluid pressure level in the rack accumulator 118. The resultant pressure level signal is then transmitted to the ECU 28. As the mechanical control valve assemblies of FIG. 3A are not electronically controlled by the ECU 28, the ECU 28 is limited to triggering an alarm in response to receiving an abnormal water pressure signal from the rack fluid sensor 126 and/or to controlling the PRS high pressure valve, RDS valve 20, and the RDR valve 24.

Figure 3B:
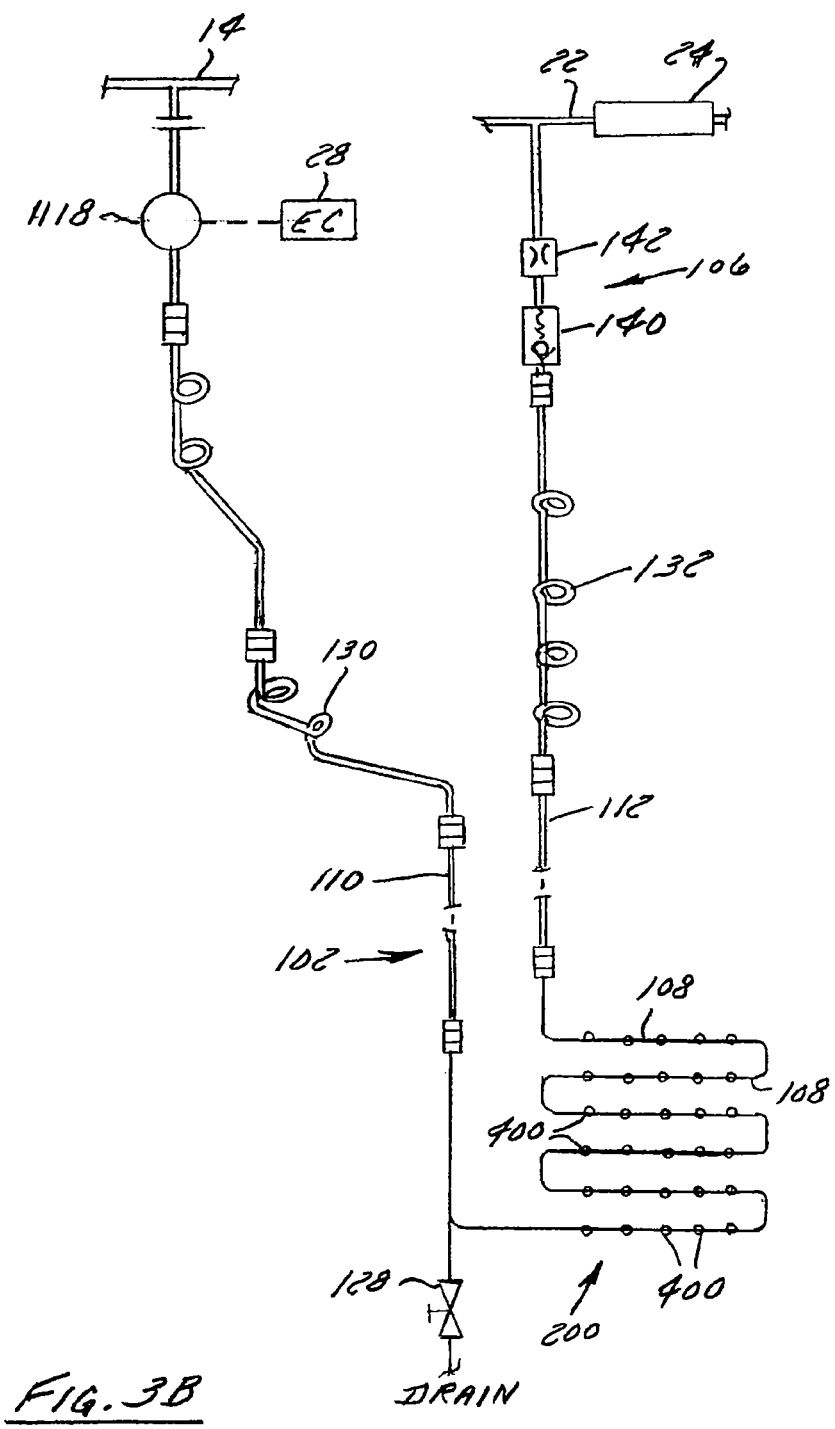
FIG. 3B is a schematic illustration of an alternative preferred embodiment of the rack-level water supply assembly of FIG. 3.

Turning now to FIG. 3B, an alternative embodiment of the rack supply system 100 of FIG. 3A is illustrated in which the controlled volume dispenser takes the form of a controlled volume delivery pump 1118 rather than an accumulator. The pump 1118 is controlled by the ECU 28 and is located in the rack manifold 102 upstream of the upstream-most row 108 in the manifold 102. Such pumps are electronically controlled to deliver a demanded volume of water at a set or controllable pressure and thus, in effect, act as a combination inlet valve and accumulator. They may be either rotational or have a linear stroke and hold the pressure in the supply line 110. As discussed above, that pressure is held relatively low during normal dispensing for the purposes of providing drinking water to animals and elevated during a flushing operation. The output pressure from the pump is at least one of produced by electrical actuation and water supply pressure to the pump or through the combination of.

Still referring to FIG. 3B, the pump 1118 may incorporate or be accompanied by a cycle counter that monitors water throughput by counting the number of pumping cycles. Hence, the controlled volume dispenser, inlet valve, and sensor may all be incorporated into the pump 1118. The ECU 28 can use this data to determine whether water usage is outside of (exceeds or falls below) expected absolute values or expected decay rates. If water usage is outside of expected values, the ECU 28 can take appropriate action such as triggering an alarm, disabling the pump 1118, opening a drain valve, etc.

Rack supply system 100 of FIG. 3B otherwise is unchanged from the system as described above in conjunction with FIG. 3A and, accordingly, will not be detailed.

3. Row Supply System

Figure 5:
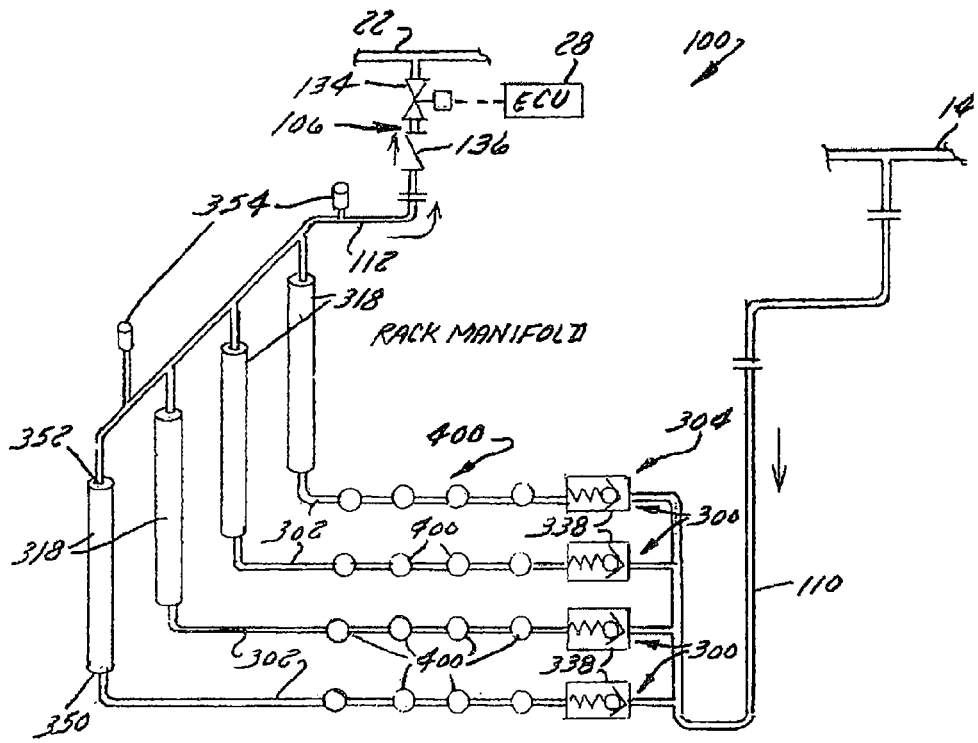
FIG. 5 is a schematic illustration of a rack-based water supply system constructed in accordance with another alternative preferred embodiment of the invention.

Referring now to FIGS. 4, 4A, and 5, and initially to FIG. 4, each row supply system 200 of this embodiment is designed to supply water to all drinking valve assemblies 400 on a given row 202 of the manifold 102. While the rows 202 of FIG. 4 are connected in a parallel manner to a common supply and return line 110, 112 of the rack manifold 102, the rows 202 may also be connected to one another in a serpentine manner, as previously illustrated in FIGS. 3 and 3A with respect to rows 108. However, a parallel connection is preferred in order to enable independent control of each row supply system 200 in the rack manifold 102 and provide consistent pressure in each row.

Still referring to FIG. 4, each row supply system 200 includes a row inlet valve 204 at one end of the row 202, and a row outlet valve 206 on an opposing end. The row inlet and outlet valves 204, 206 may be controlled either electronically or mechanically, as described in more detail below in conjunction with FIG. 4. In the illustrated embodiment, the inlet and outlet valves 204, 206 comprise spring-loaded inlet and outlet check valves 208, 210 respectively. The spring loaded inlet check valve 208 allows water to enter the row 202 when the water supplied from the water supply system 100, such as during a flushing or charging cycle, is of sufficient pressure to open the inlet check valve 208. The required fluid pressure required to bias the spring typically is between 5 psi and 10 psi and more preferably between 8 psi and 10 psi. Similarly, the outlet check valve 210 allows water to exit the row 202 when the water pressure exiting the row 202 is sufficiently high as to overcome the biasing force of the spring, but does not allow water to flow back into the row 202. A flow control orifice 212 is provided immediately downstream of the outlet check valve 210 to restrict the flow rate of water therethrough during a flush operation. As will be described in further detail below, due to its relatively higher spring constant, the outlet check valve 210 will close before the inlet check valve 208 during charging, thereby allowing a pressurized volume of water to fill the row 202. (As with the rack level valves, one or both of these valves could be integrated into the associated controlled volume dispenser).

The drinking valve assemblies 400 in each row 202 are provided between the inlet check valve 208 and outlet check valve 210. A drain valve 214 may be provide in each row supply system 200 between the inlet and outlet check valves 208, 210 and may be controlled either manually as shown or electronically via the ECU 28. Alternatively, the drain valve 214 may be replaced or supplemented by a pressure relief valve capable of draining water from the row 202 in response to an abnormally high water pressure (typically 25-30 psi or higher, depending on the particular system design.

A row level controlled volume dispenser is also provided in each row for dispensing a designated volume of water that is smaller than the volume dispensed by the rack level controlled volume dispenser. Each row level controlled volume dispenser could comprise one or more of an accumulator, a controlled volume delivery pump, or a screen or other restrictor. In addition, depending on its configuration, it could be integrated with or separate from associate components of the system such as the associated row inlet valve and sensor. In this specific embodiment, it comprises an accumulator. Specifically, and still referring to FIG. 4, each row accumulator 216 is located in the associated each row 202 between the inlet valve 204 and the first drinking valve assembly 400 in the row 202 and is configured to store a volume of drinking water therein, received from the rack supply system 100. (While specific reference is made to row accumulator 216, any alternative embodiment of the row accumulator, including those shown in FIGS. 7A-7D may be included in this discussion). The row accumulator 216 stores a sufficient volume of water at a rated pressure (typically 3-10 psi) to charge the drinking valve assemblies 400 in the row 202 for a specific period of time such as four hours. That volume preferably typically is between 110 ml and 210 ml and more preferably between 110 ml and 150 ml. This limited availability of water will eliminate the potential for uncontrolled leaks in the system 10 by limiting the available water to the drinking valve assemblies 400. The row accumulator 216 of FIG. 4 may be a spring-based accumulator or a pressurized accumulator having an air or gas charge. Various embodiments of the in-line row accumulator 216 will be discussed in further detail below in conjunction with FIGS. 7A through 7D. Alternatively, while not illustrated in FIG. 4, the row accumulator 216 may be connected to the row 202 at a single opening in the accumulator 216, via a tee.

As discussed above, flow through each row supply system 200 is controlled by actuation of one or more valves to 1) flush the system, 2) charge the accumulator, and/or 3) respond to leaks or other alarm situations. This control may be effected manually, electronically, mechanically, or a combination of two or more of these. Example of such controls and of the associated subsystem components now will be described.

The water pressure in the row accumulator 216, and thereby row supply, is monitored via a row fluid sensor 218 located at the row accumulators 216. Alternatively, the row fluid sensor 218 may be located in the row 202, as was discussed above, in the discussion of the rack supply system 100. As was also discussed above in the discussion of the rack fluid sensor 126, the row fluid sensor 218 generates a signal indicative of the fluid pressure level in the row accumulator 216, and signals the ECU 28 accordingly, to initiate a response.

In use, each row supply system 200 of FIG. 4, including the mechanical spring loaded inlet and outlet check valves 208, 210, operates in conjunction with the ECU controlled solenoid controlled water flush valve 134 and backflow preventing check valve 136 located in the return line 112 of the rack manifold 102. By means of closing the solenoid controlled water flush valve 134, and supplying water from the rack accumulator 118, each of the row supply systems 200 in the associated rack supply system 100 may be charged with pressurized water. Once a row supply system 200 has been charged, the ECU 28 can then monitor for abnormally low water pressure, indicative of a leak in an isolated row supply system 200. If such a leak is identified, an alarm may be triggered by the ECU 28 to identify the row supply system 200 associated with the leak. Recharging of the associated rack 100, as well as flushing and charging cycles may be suspended until the leak is identified and repaired. It is clearly understood that the FIG. 4 system works equally well with a rack level control valve on the supply side as 104 of FIG. 3 and valve 134 removed from the outlet.

The closed row supply system 200, such as the one illustrated in FIG. 4 and discussed above, includes an in-line row accumulator 216. Various alternative embodiments of the in-line row accumulator 216 will now be discussed in further detail in conjunction with FIGS. 7A through 7D.

Figure 7A:
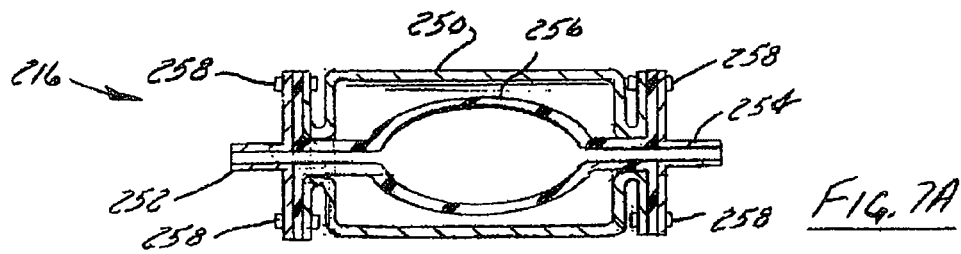
FIG. 7A is a sectional side elevation view of an accumulator usable in any of the rack, row, or valve levels of any of the water supply systems of FIGS. 1-5.

Turning now to FIG. 7A, a row accumulator 216 including a housing 250 having an inlet 252 in fluid communication with the associated inlet valve 204 and outlet 254 in fluid communication with the drinking valve assemblies 400 is shown. The accumulator 216 additionally includes a resilient bladder 256 in fluid communication with both the inlet 252 and outlet 254. The bladder 256 is configured to expand in the presence of water received at the inlet 252. The bladder 256 is sealed to the housing 250 of the accumulator 216 by a series of fasteners 258 which affix the inlet 252 or outlet 254 and housing 250 on either side of the bladder 256 in an air tight seal, respectively. As pressurized water is received at the inlet 252 and enters the bladder 256, the bladder 256 expands towards the inner wall of the housing 250 under the force of the pressurized water. Subsequently, as the pressure of the water in the bladder 256 decreases, due to drinking or a leak, water is forced through the outlet 254 of the accumulator 216.

Figure 7B:
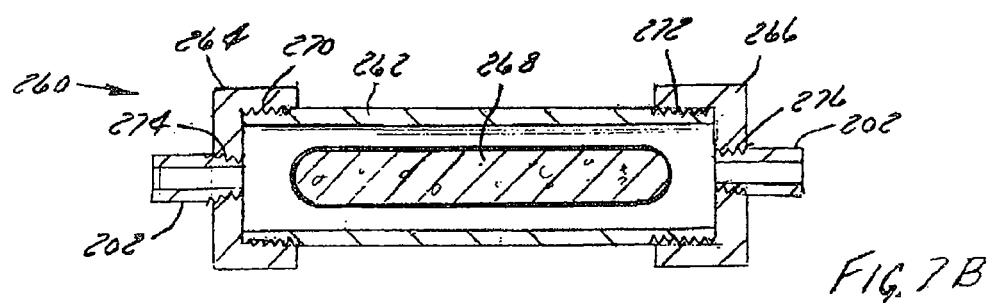
FIGS. 7B-7D are sectional side elevation views of several alternatives to the accumulator of FIG. 7A.

According to an alternative embodiment, illustrated in FIG. 7B, the row accumulator 260 may alternatively include a housing 262 having an inlet 264, an outlet 266, and a collapsible bladder 268 in the housing. The bladder 268 may, for example, be formed from a flexible material such as rubber or a resilient plastic and may be filled with a pressurized gas. In this embodiment, the inlet 264 and outlet 266 are affixed to the housing 262 via threaded fittings 270, 272, respectively. Similarly, the inlet 264 and outlet 266 are affixed to the row 202 via threaded fittings 274, 276, respectively. As pressurized water flows into the inlet 264 and enters the housing 262 of the accumulator 260, the bladder 268 contracts. As water flows out of the accumulator 260, for example, due to animal operation of the drinking valve assemblies 400 in the associated row supply system 200, the bladder 268 expands under the pressure of the gas therein to expel water from the accumulator 260.

Figure 7C:
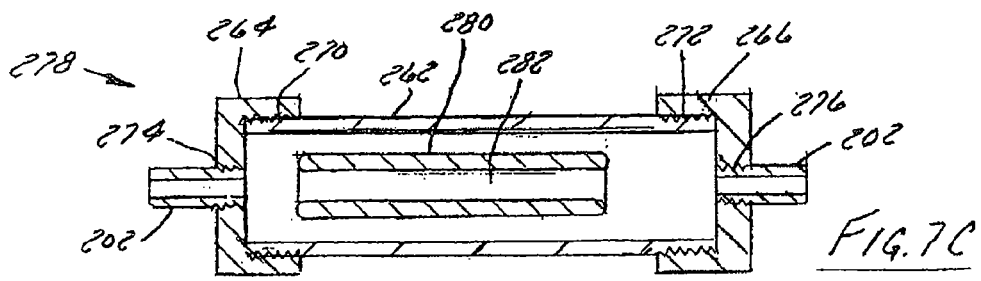

According to yet an alternative embodiment, illustrated in FIG. 7C, the row accumulator 278 may alternatively include the same housing 262, inlet 264 and outlet 266, and a gas filled elastic tube 280 disposed within a housing 262 between an inlet 264 and an outlet 266. In this embodiment, the inlet 264 and outlet 266 are again affixed to the housing 262 via threaded fittings 270, 272, respectively. Similarly, the inlet 264 and outlet 266 are affixed to the row 202 via threaded fittings 274, 276, respectively. As pressurized water is received at the inlet 264 and enters the housing 262 of the accumulator 278, the center channel 282 of the elastic tube 280 will dilate, as the gas charge contained therein compresses. The tube 280 expands upon subsequent water usage to expel water from the accumulator 278.

Figure 7D:
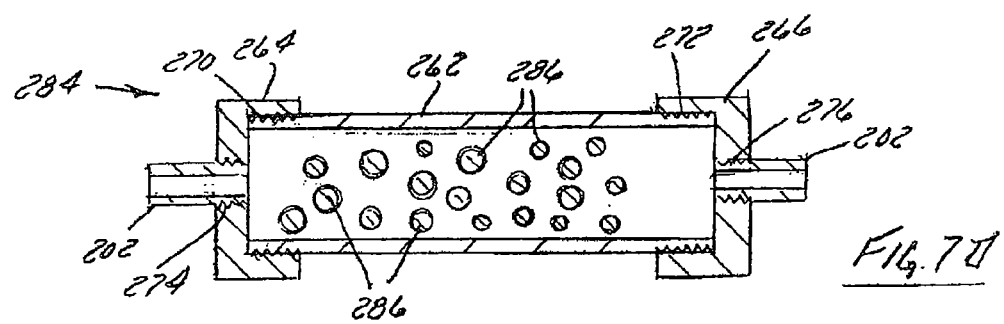

Finally, according to an alternative embodiment, illustrated in FIG. 7D, the row accumulator 284 may alternatively include a similar housing 262, inlet 264, and outlet 266, with one or more gas filled elastic objects 286 disposed within the housing 262 between an inlet 264 and an outlet 266. In this embodiment, the inlet 264 and outlet 266 are again affixed to the housing 262 via threaded fittings 270, 272, respectively. Similarly, the inlet 264 and outlet 266 are affixed to the row 202 via threaded fittings 274, 276, respectively. As illustrated in FIG. 7D, the gas filled elastic object(s) 286 may include independent elastomeric spheres, but other shapes are considered within the scope of this invention. As pressurized water is received at the inlet 264 and enters the housing 262 of the accumulator 284, each of the gas filled elastic objects 286 is compressed. The objects 286 expand upon subsequent water usage to expel water from the accumulator 284.

Figure 6A:
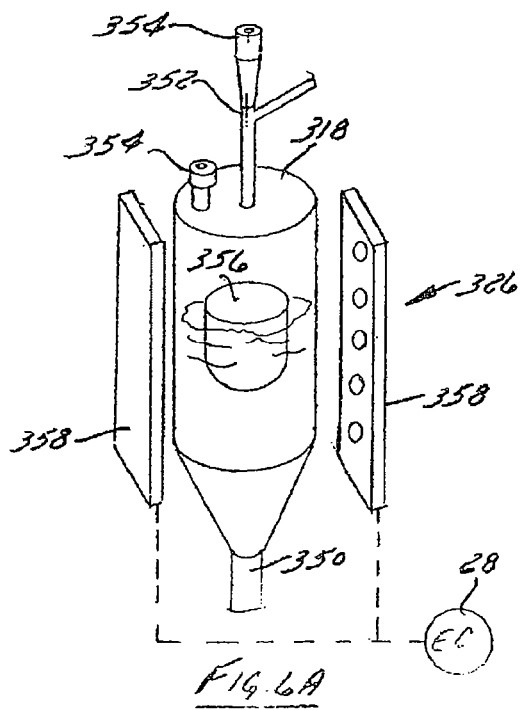
FIG. 6A is a partially cut away side elevation view of a first embodiment of a fluid sensor usable with the water supply system of FIG. 5
Figure 6B:
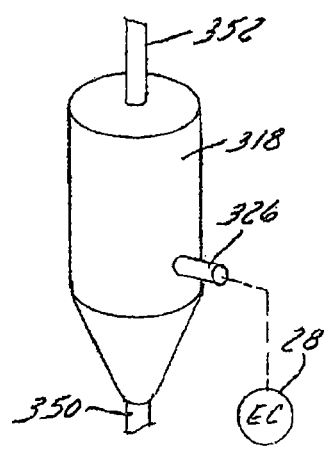
FIG. 6B is a is a partially cut away side elevation view of a second embodiment of a fluid sensor usable with the water supply system of FIG. 5.

Turning now to FIGS. 5, 6 and 6B, another alternative embodiment of the row supply system is illustrated. The row supply system of FIG. 5 is an open-air row supply system 300 that utilizes gravitational forces to pressurize the water in the open-air row supply systems 300, rather than the air/gas charged row accumulator 216 of FIG. 4.

In FIG. 5, water is received at each open-air row supply system 300 from the rack supply line 110. The water may travel through the rack manifold 102 via gravitational force or a pressurized rack accumulator (not shown in FIG. 5), as previously discussed. Each open-air row supply system 300 of FIG. 5 has a row inlet valve 304, a plurality of drinking valve assemblies 400, and a reservoir 318 equipped with a fluid sensor 326 disposed along a row 302. Downstream of the reservoirs 318, the open-air row supply systems 300 combine at the return line 112 of the rack manifold 102. The rack outlet valve 106 is an electronically controlled water flush valve 134 located in the return line 112 of the rack manifold 102, upstream of the water supply system 10 return line 22.

Specifically, the row inlet valve 304 of FIG. 5 is a spring loaded check valve 338 of the kind previously discussed at FIG. 4. The reservoir 318 includes a bottom opening 350 and a top opening 352. As water fills the open-air row supply system 300, water enters the reservoir 318 through the bottom opening 350, fills the reservoir 318, and exits the top opening 352 until its flow is interrupted by the closed water flush valve 134 in the return line 112 of the rack manifold 102. While not shown, an alternative orientation of the reservoir 318, in which the reservoir is top filled, is considered to fall within the scope of this embodiment of the invention. Due to the vertical orientation of the reservoir 318 above the drinking valve assemblies 400, water flows downward by gravity from the bottom opening 350 of the reservoir and into the row 302 to provide the various drinking valve assemblies 400 with pressurized water. Air vents 354, located either in to the top of the reservoir or in fluid communication with the reservoirs 318, allow for replacement air to enter the reservoir 318 when water is lost due to animal drinking, and allow for air to exit the reservoir 318 when water is added during to flushing or charging of the rack supply system 100. The air vents 354 may be filtered so as to prevent airborne contaminants from entering the drinking water. Further, the air vents 354 may include check valves to prevent excess water from flowing out of the reservoir via the air vent.

Downstream of the reservoirs 318, drinking water which exits the top opening 352 of the reservoirs 318 from the various row supply systems 300 is combined in the return line 112 of the rack manifold 102. The water flush valve 134 is controlled by the ECU 28, and functions in the same manner as the rack outlet valve 106 described above in conjunction with FIG. 3. The flush and charge cycle may be controlled by a mechanical control valve in the same manner as the rack outlet valve 106 described above in conjunction with FIG. 3A.

Additionally, as is illustrated in FIGS. 6A and 6B, each reservoir 318 contains a fluid sensor 326 for directly or indirectly monitoring the water pressure in the associated row 302. In one embodiment, as illustrated in FIG. 6A, the fluid sensor 326 indicates the height of the water in the reservoir 318 via a float 356 that remains located at the top of the waterline, within in the reservoir 318. The location of the float 356, and thereby the water level, may be sensed by an optical sensor 358 generating and receiving a light beam (not shown) on opposing sides of the reservoir 318. The uppermost location at which the light beam is broken by the float 356 indicates the height of the float 356 within the reservoir 318. The optical sensor 358 thereby generates a signal indicating the height of the water in the reservoir. Upon receiving the signal, the ECU 28 can determine the volume of water located within the reservoir 318 and the pressure of the water in the associated open-air row supply system 300, based on the reservoir dimensions.

In another embodiment, as illustrated in FIG. 6B, the fluid sensor 326 may be a pressure sensor that generates a signal indicating the water pressure at the base the reservoir 318. The signal is received at the ECU 28, which again can determine the volume of water located within the reservoir 318, based on the reservoir 318 dimensions.

In use, the ECU 28 may open the water flush valve 134 to trigger a flush or charge cycle in response to receiving a signal from the row fluid sensors 326 indicating low water volume within the expected range of normal animal drinking. However, if the ECU 28 receives a signal indicating abnormally high or low water volume, i.e. beyond the range of normal animal drinking, the ECU 28 may trigger an alarm indicating a malfunction in a given open-air row supply system 300. The ECU 28 may also trigger a response to a malfunction, such as a leak, including suspending the recharging and flushing and charging cycles of the associated rack supply system 100, until the leak location is identified and repaired.

4. Drinking Valve Assembly

As previously indicated, each row supply system 200 includes a plurality of drinking valve assemblies disposed between the row inlet valve 204 and row outlet valve 206. Each drinking valve assembly is a device or assembly that can be actuated by an animal to supply on-demand water to the animal or animals housed in an associated cage 32 of the rack 34. It is preferred, but not essential, that each drinking valve assembly have a controlled volume dispenser and inlet valve associated therewith, either as separate components operating in conjunction with a watering valve of the drinking valve assembly or as components or at least the functionality thereof integrated into the drinking valve assemblies. For example, a controlled volume pump and an external check valve or a controlled volume pump having an internal check valve mechanism could supply a controlled volume of drinking water to each drinking valve assembly. The internal check valve of such a pump could be either separated from or functionally integrated with the pumping mechanism of the pump.

Referring now to FIGS. 8 through 16, some, but not all, drinking valve assemblies usable in the water supply system 10 are illustrated and described below.

Figure 8:
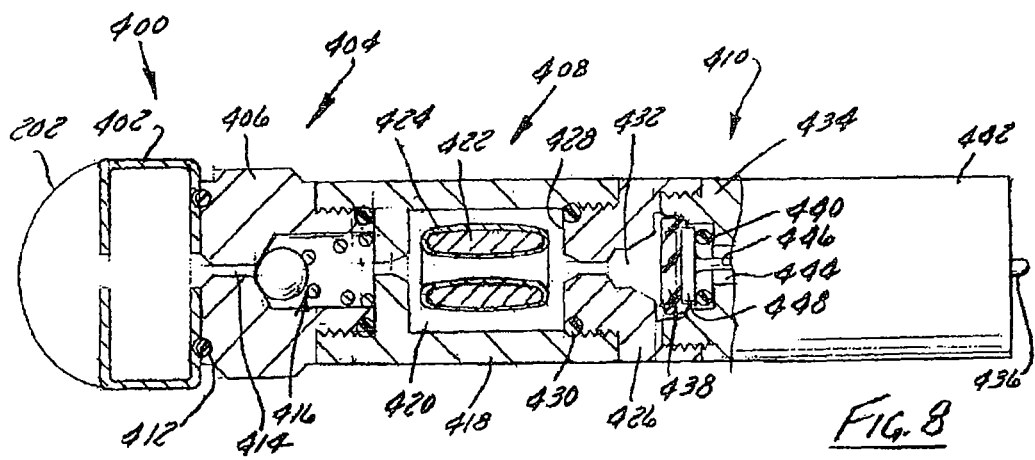
FIG. 8 is a side sectional elevation view of a first embodiment of a valve-based water supply subassembly usable with any of the water supply systems described herein.

Referring initially to FIG. 8, a drinking valve assembly 400 is shown in fluid communication with the row 202 of the row supply system 200 at a junction point 402, such as a punch pipe. Each drinking valve assembly 400 includes a drinking assembly inlet valve 404 located within a seat 406, a valve level controlled volume dispenser 408, and a drinking valve 410 attached in-line via threaded engagements, respectively. The inlet seat 406, inlet valve 404, controlled volume dispenser 408, and drinking valve 410 are in fluid communication with the interior of the associated row of the row supply system 200 and supply pressurized drinking water to the animal when the drinking valve 410 is actuated by the animal.

The seat 406 of the drinking valve assembly 400 abuts the row 202 via the junction point 402 and forms a water tight seal with the row 202. The water tight seal may also be formed by an O-ring 412 or other sealing gasket located between the row 202 and the seat 406. A central channel 414, disposed within the seat 406, supplies the pressurized drinking water to the drinking valve assembly 400. Housed within the seat 406 is an inlet valve 404. As seen in FIG. 8, the inlet valve 404 is a spring actuated check valve 416 that allows one-way fluid flow into the accumulator 408 from the seat 406. Inlet valve 404, as well as all other check valves disclosed herein, could also be an unbalanced two-way check valve allowing water to flow into the valve level controlled volume dispenser 408 as stated above and allowing water to flow out of the r valve level controlled volume dispenser 408 when pressures therein 408 grow much higher than normal due, e.g, from high temperature exposure during cleaning in an autoclave or during rack wash processes. This unbalanced two way check valve can be applied to all of the designs of FIG. 8 through 14. A separate relief valve also could be employed instead of or in addition to an unbalanced two-way check valve in order to relieve pressure that may build up in a high temperature environment such as an autoclave.

The valve level controlled volume dispenser preferably dispenses a designated volume of water that is smaller than the volume dispensed by the rack level controlled volume dispenser and the row level controlled volume dispenser. Each valve level controlled volume dispenser could comprise one or more of an accumulator, a controlled volume delivery pump, a screen or other flow restrictor, etc. As discussed above, each controlled volume dispenser could also have the inlet valve separated therefrom or integrated therein, either structurally or, in the case of a controlled volume pump for example, as an operational feature of the pumping mechanism or other operational feature of the controlled volume dispenser. In this case, the pump could be actuated or at least triggered by the animal through the animal's actuation of the watering valve. This actuation could complete at least one pump stroke cycle and load a chamber or to dispense water directly to the animal through the drinking valve.

In this specific embodiment, the controlled volume dispenser comprises an accumulator that is separated from the inlet valve 404. The valve level accumulator 408 of FIG. 8 includes an outer housing 418 having an interior 420 for receiving a volume of water. The interior 420 of the housing 418 also includes at least one chamber 422 located within an elastic tube 424. As with the accumulators heretofore described, the accumulator could be filled with a gas, a pressurized liquid, or could be spring loaded FIG. 7C. The chamber 422 constricts in response to the presence of pressurized water within the housing interior 420.

Downstream of the valve level accumulator 408 is a valve cap 426, which forms a rigid downstream wall 428 of the accumulator 408. A water tight seal may be formed at the downstream wall of the accumulator by an O-ring 430 or other type of sealing gasket. A water channel 432 is located along the longitudinal axis of the valve cap 426 for transporting pressurized water from the valve level accumulator 408 to the drinking valve 410.

The drinking valve 410 includes a valve seat 434, an animal activation stem 436, a diaphragm 438, and an O-ring 440. The valve seat 434 includes an elongated housing 442 with a central channel 444 disposed therein. The central channel 444 receives drinking water from the valve cap 426 at one end, and releases the drinking water to an animal on the opposing end. The animal activation stem 436 includes 1) an elongated rod 446 located within the channel 444 of the valve seat 434 and 2) a flattened head 448, captured between a diaphragm 438 and an O-ring 440. The diaphragm 438 engages the valve cap 426 and prevents pressurized drinking water from passively traveling into the valve seat 434, i.e. leaking. The opposing end of the stem 436 protrudes beyond the elongated housing 442 of the valve seat 434, and allows an animal to move or pivot the stem 436 about the fulcrum at the O-ring 440, when drinking water is desired. The pivoting motion of the stem 436 causes the flattened head 448 of the stem 436 to temporarily distort the diaphragm 438 to permit pressurized drinking water to flow through the drinking valve 410. When the animal releases the stem 436, the diaphragm 438 returns to a closed position, ceasing the flow of drinking water. Of course, any other suitable drinking valve could be used in place of drinking valve 410.

Figure 9:
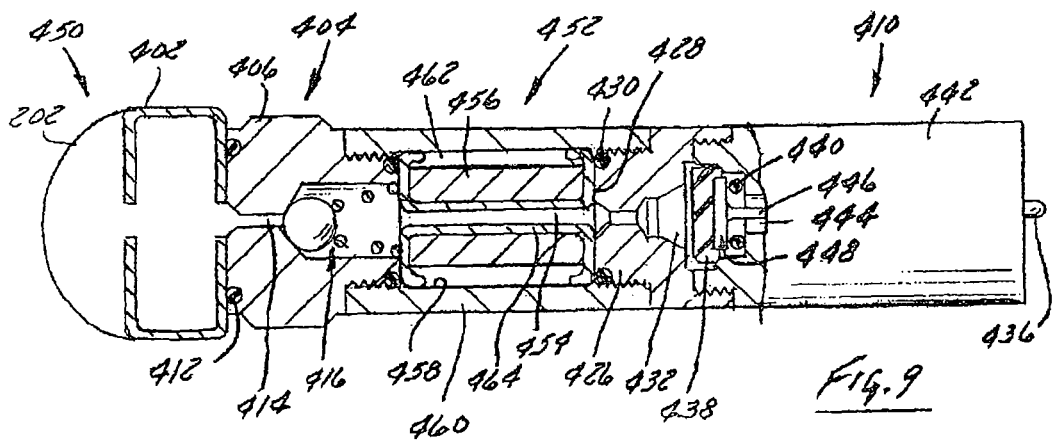
FIGS. 9-14 are side sectional elevation views of second through eight embodiments of drinking valve assemblies usable with any of the water supply systems described herein.

Turing now to the alternative embodiments of the drinking valve assembly 450, FIG. 9 illustrates an alternative embodiment of the interior component of a valve level accumulator 452. The remaining portions of the drinking valve assembly 450, including the drinking assembly seat 406, inlet valve 404, valve cap 426, and drinking valve 410 remain consistent with those disclosed in the prior discussion of drinking valve assembly 400 and illustrated in FIG. 8.

The interior of valve level accumulator 452 of FIG. 9 includes a central water channel 454 disposed within a gas filed tube 456. The gas filed tube 456 is offset from the interior wall 458 of accumulator housing 460, such that an annular void 462 is formed between the housing 460 and the gas filled tube 456. An elastic tube 464 seals the interior of the gas filled tube 456 from the void 462. As water enters the accumulator 452 of FIG. 9, the walls of the gas filled tube 456 contract, dilating the channel 454 of the tube 456 and contracting the volume of the void 462 to accommodate the increased volume of water entering the valve level accumulator 452. As water flows out of the accumulator 452, for example, due to animal operation of the drinking valve 410, the tube 456 expands due to decreased water pressure in the accumulator 452.

Figure 10:
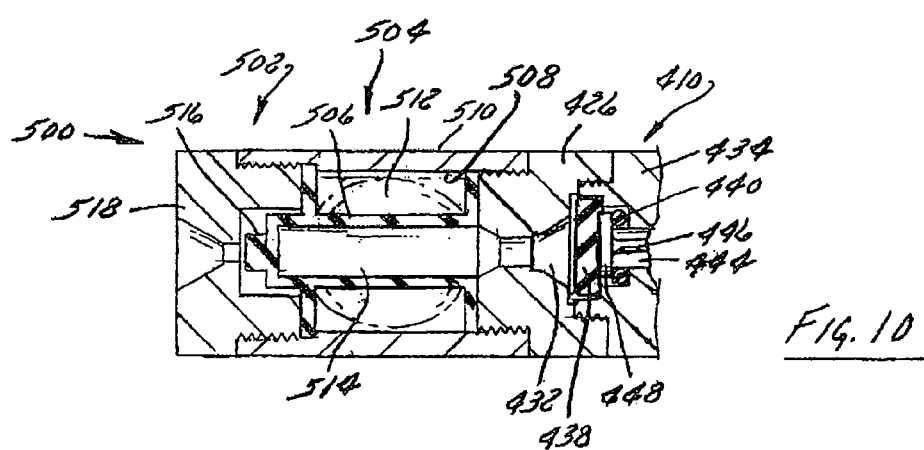

Turning to another alternative embodiment of the drinking valve assembly 500, FIG. 10 illustrates an alternative embodiment of an inlet valve 502 and valve level accumulator 504. The remaining portions of the drinking valve assembly 500, including the valve cap 426, and drinking valve 410, remain consistent with those disclosed above and illustrated in FIG. 8.

In FIG. 10, a valve level accumulator 504 is illustrated, having an elastic bladder 506 disposed within and offset from the interior wall 508 of the accumulator housing 510, such that a gas filled void 512 is formed between the housing 510 and the elastic bladder 506. The interior of elastic bladder 506 is primarily cylindrical in shape, forming a water receiving area 514 surrounded by the gas filled void 512. Further, the elastic bladder 506 contains a resilient protrusion 516 located at the upstream end. The resilient protrusion 516 engages a seat 518 of the drinking valve assembly 500 seen in FIG. 10, thereby forming the inlet valve 502, without the ball and spring utilized in the embodiments illustrated in FIGS. 8 and 9. During use, the resilient protrusion 516 retracts from the seat 518 when water pressure in the accumulator 504 drops below the water pressure of the row 202, thereby allowing water to fill the accumulator 504. The resulting increased water pressure in the accumulator 504 forces the resilient protrusion 516 to expand into a closed position, against the seat 518, once a sufficient volume of water has been received within the accumulator 504. As water enters the accumulator 504 of FIG. 10, the volume of the water in the receiving area 514 of the elastic bladder 506 expands, thereby expanding the walls of the bladder 506 and contracting the volume of the gas filled void 512. The resultant force urges water out of the drinking valve 410.

Figure 11:
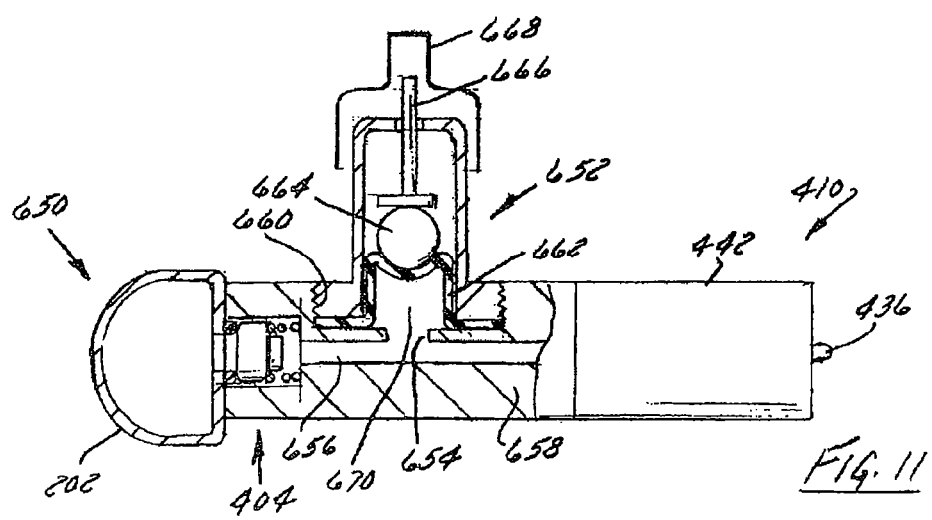
Figure 12:
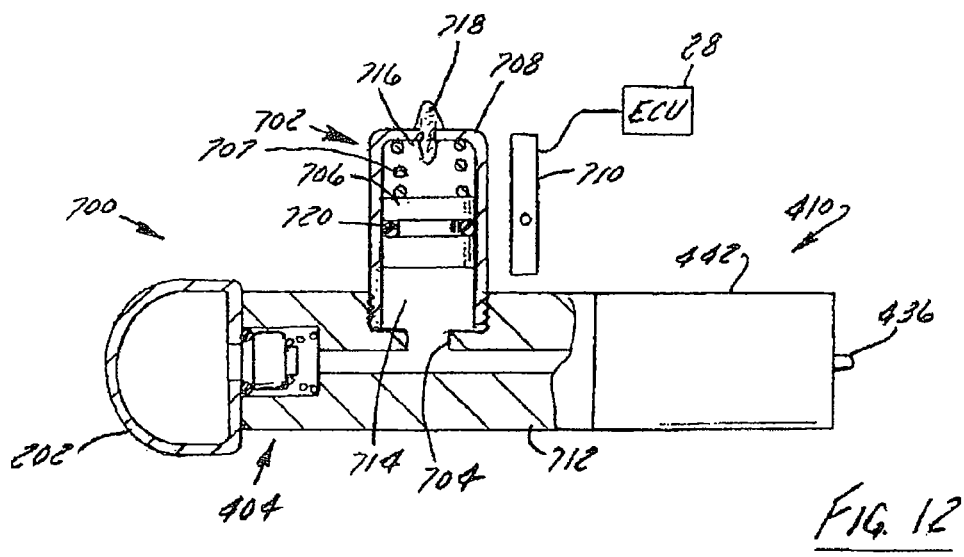

Turning now to FIGS. 11 and 12, two additional embodiments of the drinking valve assembly 650, 700 are illustrated. In each of these embodiments, the valve level accumulator 652, 702 is an offset valve level accumulator 652, 702 having a single fluid opening 654, 704, actuated by gravitational force on a weighted ball in 652 and with a spring loaded piston accumulator in 702. The remaining portions of the drinking valve assemblies 650, 700, including the inlet valve 404, valve cap 426 and drinking valve 410, remain consistent with those disclosed above and illustrated in FIG. 8.

Referring initially to the drinking valve assembly 650, shown in FIG. 11, the drinking assembly inlet valve 404 and drinking valve 410 are connected via a channel 656 disposed within a housing 658. The channel 656 is also in fluid communication with the accumulator 652, which is attached perpendicularly to the housing 658 via a threaded member 660. The valve level accumulator 652 of FIG. 13 includes a watertight elastic membrane 662 engaging the drinking water within the channel 656. A weighted ball 664 and an indicator pin 666 are located on the opposing side of the elastic membrane 662. The indicator pin 666 has one end that engages the weighted ball 664 and another end that extends into a clear viewing shield 668.

In use, as water enters the accumulator chamber 670 through the one-way inlet valve 404, the elastic membrane 662 extends, forcing the weighted ball 664 and indicator pin 666 to rise. When water flows out of the chamber 670 due to drinking valve actuation or leakage, gravity forces the weighted ball 664 down onto the elastic membrane 662. As the weighted ball 664 descends, so does the indicator pin 666. The descending height of the indicator pin 666, which can be seen through the clear viewing shield 668, allows a user to identify the volume of pressurized water present in the drinking valve assembly 650, responsive to either animal drinking or a leaking drinking valve 410.

Alternatively, the drinking valve assembly 700, as seen in FIG. 12, includes the offset valve level accumulator 702 having a piston 706, a piston housing 708, a piston spring 707, and a piston sensor 710. The piston housing 708 is attached perpendicularly to a housing 712 disposed between the drinking assembly inlet valve 404 and the drinking valve 410, such that one side of the piston 706 is in fluid communication with a fluid channel 714. On the opposing side of the piston 706 is a chamber 716, formed by the piston housing 708 and piston 706. The chamber 716 maintains atmospheric pressure via an air vent 718 located within the piston housing 708, seen in FIG. 12. An O-ring or seal gland 720, located around the circumference of the piston 706, prevents any pressure or water leaks between the piston 706 and piston housing 708. In use, the piston 706 rises as water flows into and fills the channel 714 from the one-way inlet valve 404 during a charge operation. The spring 707 is compressed as the pressurized water enters the piston housing 708 and causes the piston 706 to rise. As water flows out of the accumulator channel 714 due to animal operation of the drinking valve 410 or a leak, spring 707 forces the piston 706 downward. As the piston 706 descends, an external piston sensor 710 identifies the location of the piston 706 and transmits a signal to the ECU 28 or another ECU, indicating the volume of water within the drinking valve assembly 700. The piston sensor 710 may, for example, be magnetically based, having either a magnet or ferrous metal component disposed within the piston 706. If the signal received at the ECU 28 indicates an abnormal decrease in the volume of water, i.e. a leak, the ECU 28 may trigger an alarm or a response. The response may include suspending the recharge or flush and charge cycle of the row supply system 200 and/or the rack supply system 100 associated with the leaking drinking valve assembly 700, until the leak is repaired.

Figure 13:
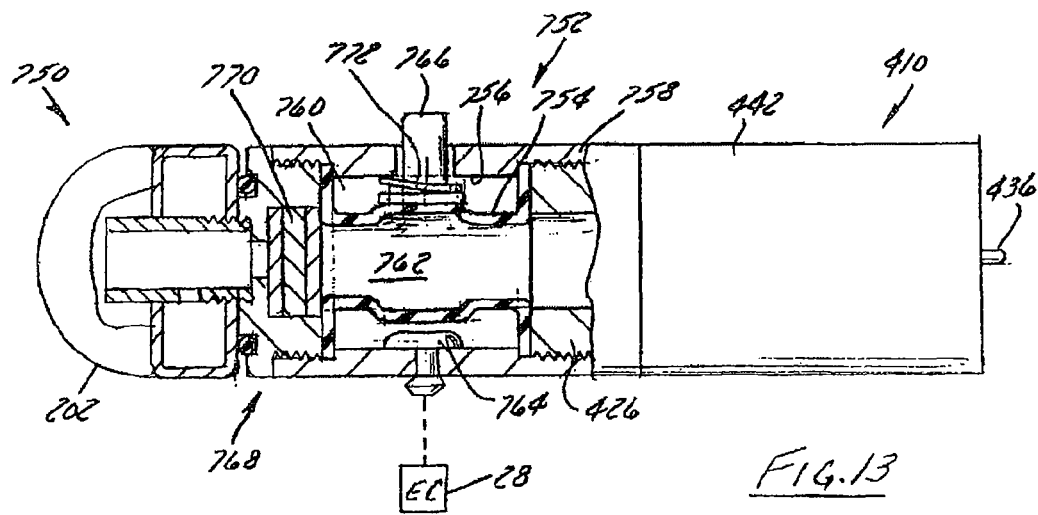
Figure 14:
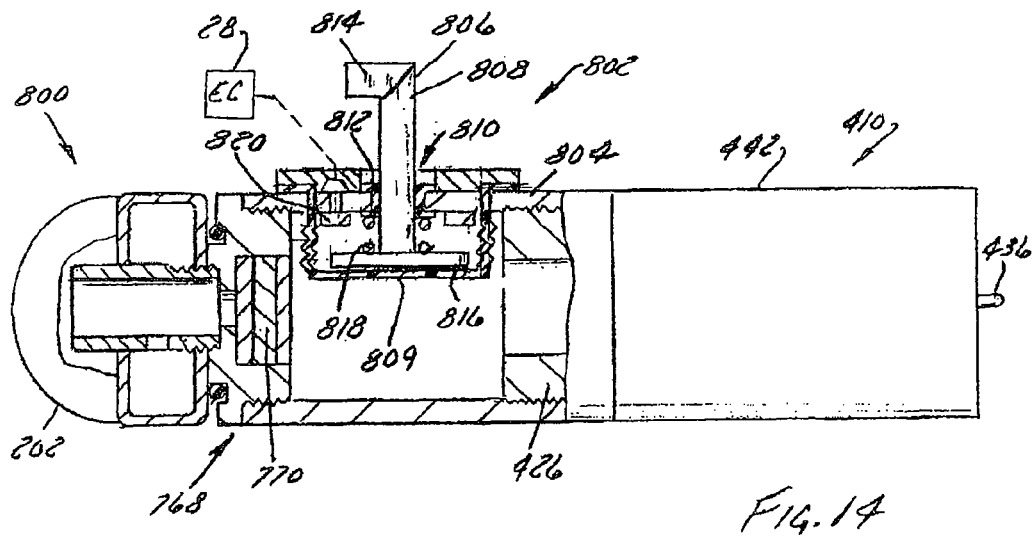
Figure 18:
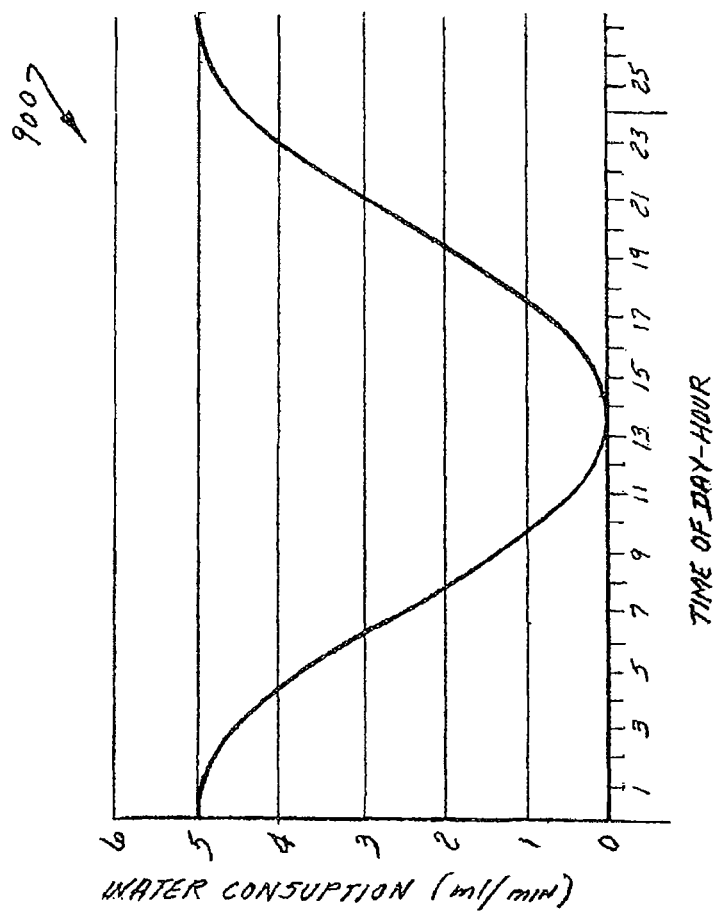
FIG. 18 is a side elevation of a portion one of the drinking valve assemblies of FIG. 17 that contains one of the indicators and showing the indicator in a retracted position.

Turning now to FIGS. 13 and 14, additional alternative embodiments of the drinking valve assembly 750, 800 are illustrating including both visual and electrical indicators of water volume disposed within the valve level accumulator 752, 802 respectively. Beginning with FIG. 13, a valve level accumulator, accumulator 752 is shown having an elastic or resilient bladder 754 disposed within and offset from the interior wall 756 of the housing 758 of the accumulator 752. An annular void 760 is resultantly formed between the housing 758 and the bladder 754. The interior 762 of the bladder 754 is primarily cylindrical in shape, forming a water receiving area surrounded by the void 760. Furthermore, the embodiment illustrated in FIG. 13 contains a force sensor and/or switch 764 and an indicator pin 766 disposed with the housing 758 of the accumulator 752. Both the indicator pin 766 and force sensor and/or switch 764 extend through the housing 758 and into the void 760. It should be emphasized that both of these devices need not be present and that this embodiment is also applicable to assemblies having only one of the force sensor 764 and the indicator pin 766.

Additionally, the inlet valve 768 of the drinking valve assembly 750 of FIG. 13 includes an integral filter 770. The drinking assembly inlet filter 770 may comprise a filter, a screen, flow control orifice, or a plurality of small holes in a solid medium. The drinking assembly inlet filter 770 may also be a low permeability material that allows low volume bidirectional or unidirectional water movement there through, sufficient to maintain pressure gradients on opposing sides of the filter 770. The same or similar filter 770, or any other controlled volume dispenser, could be used in any or all of the remaining embodiments disclosed herein instead of or even, in some designs, in addition to the specific accumulator or other controlled volume dispenser disclosed in association therewith.

In use, as water enters the valve level accumulator 752, the resilient bladder 754 flexes towards the housing walls 756, thereby decreasing the volume of the void 760, until the bladder 754 engage the force sensor 764 and indicator pin 766. In response to the presence of water acting of the bladder 754, the force sensor 764 transmits a signal to the ECU 28 indicating the volume of water in the accumulator 752. If the signal received at the ECU 28 indicates an abnormal decrease in the volume of water, i.e. a leak, the ECU 28 may trigger an alarm or a response. The response may include suspending the recharge or flush and charge cycle of the row supply system 200 and/or the rack supply system 100 associated with the leaking drinking valve assembly 750, until the leak is repaired.

Similarly, in response to the presence of water acting of the bladder 754, the indicator pin 766 is moved. In one embodiment, the indicator pin 766 may be spring loaded by spring 772, such that, when water volume in the accumulator 752 is low, the pin 766 is retracted into the housing 758, and extends outward from the housing 758 in response to increased water volume. Alternatively, the indicator pin 766 may lack a spring 772, and retract into the housing 758 via gravitational force in the absence of high water volume, and extend outward from the housing 758 in response to increased water volume. Lack of movement or rapid retraction of the indicator pin 766 may provide visual indication of a leak to an operator. The operator may then suspend the recharge or flush and charge cycle of the row supply system 200 and/or the rack supply system 100 associated with the leaking drinking valve assembly 750, until the leak is repaired.

Referring now to FIG. 14, an alternative embodiment of a drinking valve assembly 800 is shown having a drinking assembly inlet valve 768 and filter 770 similar to FIG. 13, and a constant volume valve level accumulator 802. The accumulator 802 of FIG. 16 includes a fixed volume for receiving water within the housing 804. Disposed within the housing 804 is a spring loaded indicator pin 806 for indicating the volume of drinking water in the accumulator 802. The indicator pin 806 includes an elongated shaft 808 which extends through an opening 810 in the housing 804. A seal 812 is located between the pin shaft 808 and opening 810 as to prevent any water from leaking out of the accumulator 802. The exposed end of the pin 806 may include a visual identifier such as a flag 814, while the end of the pin 806 located within the housing 804 of the valve level accumulator 802 may be a flattened head 816. As illustrated in FIG. 14, the flattened head 816 engages a spring 818, which biases the pin 806 into a retracted position within the accumulator 802 in the absence of water. As the water volume in the accumulator 802 rises, the spring 818 is compressed and the indicator pin 806 is raised until the flattened head 816 engages a force sensor 820 disposed in the housing 804. When the force sensor 820 is activated by contact with the flattened head 816 of the indictor pin 806, a signal is transmitted to the ECU 28 indicating that the drinking assembly accumulator 802 is filled to capacity. If the signal received at the ECU 28 indicates an abnormal decrease in the volume of water, i.e. a leak, the ECU 28 may trigger an alarm or a response. The response may include suspending the recharge or flush and charge cycle of the row supply system 200 and/or the rack supply system 100 associated with the leaking drinking valve assembly 800, until the leak is repaired. Further, any lack of movement or rapid retraction of the indicator pin 806 may provide an additional visual indication of a leak to an operator. The operator may then manually suspend the recharge or flush and charge cycle of the row supply system 200 and/or the rack supply system 100 associated with the leaking drinking valve assembly 800, until the leak is repaired.

FIGS. 15-18 illustrate variations of the embodiment shown in FIG. 14 in which the indicator pin 806 is monitored by an optical sensor 850 rather than a force sensor 820. Specifically, FIGS. 15 and 17 each illustrate a row 202, having a plurality of drinking valve assemblies 800 disposed along the row 202. As seen in FIG. 15, the indicator pins 806 of the respective drinking valve assembly accumulators 802 are in an elevated position, indicating the presence of drinking water within the valve level accumulators 802. An external light sensor 850, such as a laser light sensor or an inferred sensor, (sensor receiver half not shown) may extend over the tops of the drinking valve assemblies 800 of a given row supply system 200. The elevation of the indicator pins 806, as seen in FIG. 15 may not interrupt the light path 852, thereby sending a signal to the ECU 28 indicating high water volume in the valve level accumulators 802. Specifically, the beam passes below all flags 814 in a row 202 when the accumulators 802 are filled. If one of the accumulators 802 empties as shown in FIG. 19, the flag 814 of the indicator pin 806 of the respective valve level accumulator 802 retracts, indicative of little or no drinking water within the associated valve level accumulator 802. In this orientation, the flag 814 of the retracted indicator pin 806 interrupts the light path 852, thereby causing the sensor 850 to send a signal to the ECU 28 indicating low water volume in row 202. Based on the rate of signals received at the ECU 28, the ECU 28 may identify and respond to a leak by sounding an alarm or triggering a response.

Similarly, FIG. 16 offers a detailed side view of the indicator pin 806 of FIG. 15, in an elevated position, indicating the presence of drinking water in the associated valve level accumulator 802, while permitting uninterrupted transmission of the light path 852, e.g. laser or inferred beam, past the flag 814 of the indicator pin 806. Alternatively, FIG. 18 offers a detailed side view of an indicator pin 806 in a retracted position, indicating the absence of drinking water from the associated valve level accumulator 802, and an interrupted laser or inferred light beam 852 with the flag 814 of the indicator pin 806.

5. In Use

Having previously described the structure of the water supply system 10, rack supply system 100, row supply system 200, 300 and drinking valve assemblies 400, in accordance with embodiments of the invention, the water supply system 10 will now be described in use. (While specific reference is made to drinking valve assembly 400, any alternative embodiment of the drinking valve assembly, including any of those shown in FIGS. 8-14, may be included in this discussion. Similarly, any alternative embodiment of those components of the drinking valve assembly, i.e. inlet valve, valve seat, accumulator, drinking valve, and their respective subcomponents may also be included in this discussion).

At each level of the water supply system 10, i.e. rack, row, and drinking valve assemblies, an accumulator 118, 216, 408, etc., is charged with a pressurized volume of water. This controlled volume of water is then available for distribution throughout the corresponding assembly over a designated amount of time. The volume of water in the accumulators 118, 216, 408 is limited as to prevent over watering, were a leak to develop within the system 10.

Simultaneously, the ECU 28 monitors the volume of water located within the respective accumulators 118, 216, 408 either on an absolute basis or, more preferably, as a function of time, to determine the rate of decay. If the rate of decay is considered within an acceptable parameter, the ECU 28 may allow the water supply system 10 to automatically recharge or flush and charge downstream accumulators 118, 216, 408, on a predetermined schedule, and thereby continue uninterrupted water supply to the cages 32. Alternatively, if the rate of decay is considered beyond an acceptable parameter, indicating, for example, that a leak has occurred within the system 10, the ECU 28 may interrupt the water supply system's automatic recharge or flush and charge cycle to prevent excess water leakage.

Figure 20:
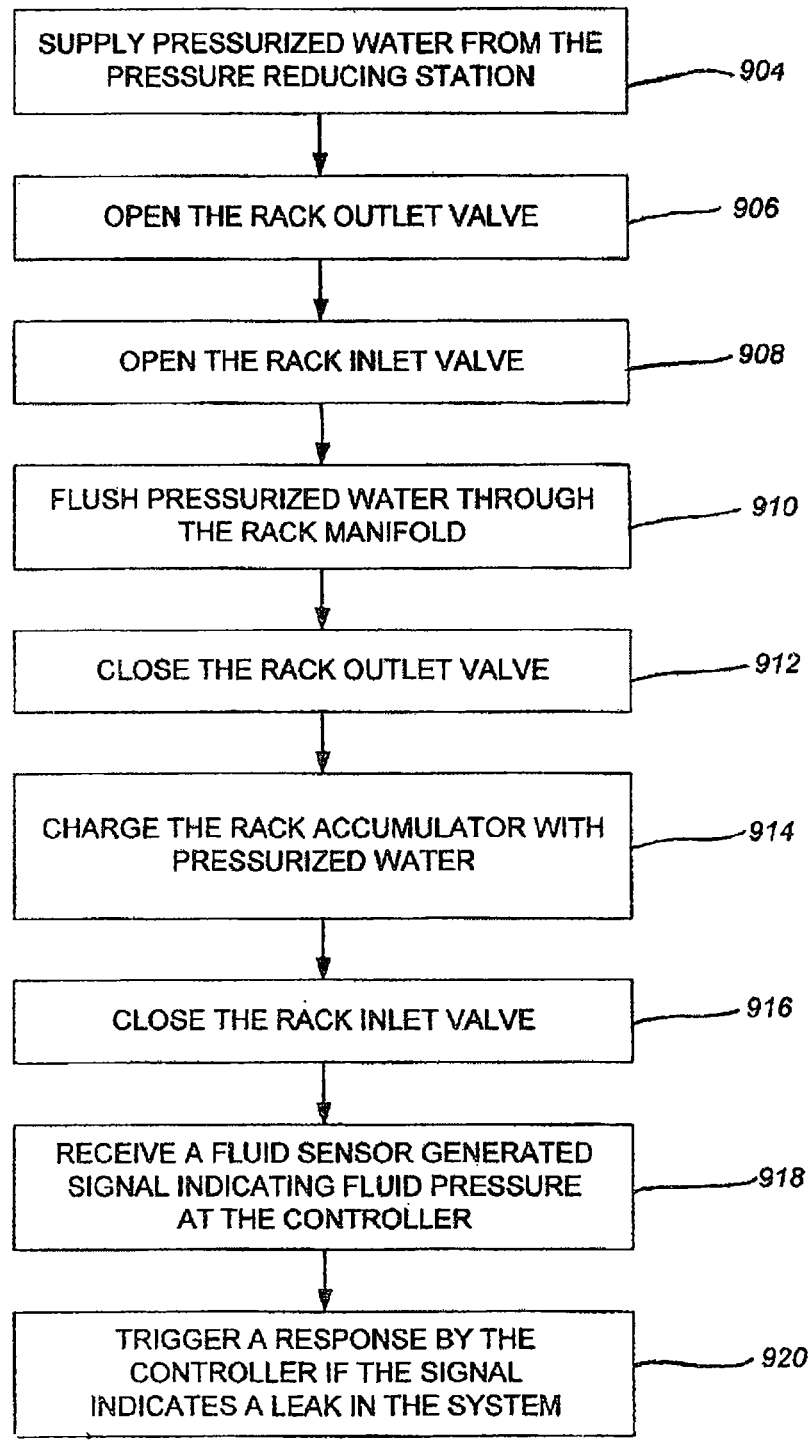
FIG. 20 is a flow chart illustrating a method of using the water supply system of FIG. 1.

In a first step, as illustrated in the flow chart 902 at FIG. 20, the rack supply system 100 is charged with a volume of water from the PRS 18 in a flushing type supply system, which is pressurized in the rack accumulator 118, row accumulators 216, and drinking valve assembly accumulators 408. Charging the system 10 requires first supplying pressurized water from the PRS 18, as depicted in Block 904. The rack outlet valve 106 is then opened, followed by the rack inlet valve 104, as shown in Blocks 906 and 908, respectively. The rack inlet valve 104 also could be opened before outlet valve 106 or in unison with the same result. The pressurized water is then flushed through the open rack manifold 102, as seen in Block 910. After flushing, the rack outlet valve 106 closes, as shown in Block 912. As seen in Block 914, the supply of pressurized water continues to fill the rack manifold 102 and charges the rack accumulator 118 upstream of the rack outlet valve 106, once the valve 106 has closed. Once the rack accumulator 118 is charged, the rack inlet valve 104 closes, as seen in box 916. The fluid sensor 126 then generates a signal indicating the water pressure in the rack accumulator 118, and transmits the signal to the ECU 28, as shown in Block 918. Finally, as seen in Block 920, if the signal received at the ECU 28 is indicative of a leak in the system 10, the ECU 28 may trigger a response, as previously discussed.

The volume of water supplied to the system 10 preferably is determined according to the given animals' regular water consumption needs over the time period in which the water is to be administered. That is to say, some animals, such as mice, consume a large volume of water during the night, as opposed to during the day, as illustrated in the graph 900 of FIG. 19. Therefore, the volume of water provided in a given charge may be adjusted according to the time period in which the animal will be drinking. Alternatively, the frequency of charges may be adjusted according to the time period in which the animal will be drinking. As seen below, Table 1 identifies one example of water consumption in a system housing mice over the course of one day. Specifically, Table 1 identifies the rate of water consumption, in ml/min, during each individual hour, over the course of one day. Hours "0" and "24" represent midnight, and show the highest corresponding water consumption rate, while hour "12" represents noon and shows the lowest corresponding water consumption rate. The data contained in Table 1 is graphically illustrated in curve 900 of FIG. 19.

TABLE 1

| Time of Day (Hours) | Water Consumption (ml/min) |
|---|---|
| 0 | 5 |
| 1 | 4.9149 |
| 2 | 4.665395 |
| 3 | 4.268471 |
| 4 | 3.751149 |
| 5 | 3.14865 |
| 6 | 2.501991 |
| 7 | 1.855196 |
| 8 | 1.2523 |
| 9 | 0.734346 |
| 10 | 0.336597 |
| 11 | 0.086133 |
| 12 | 0.00000317 |
| 13 | 0.084073 |
| 14 | 0.332618 |
| 15 | 0.728717 |
| 16 | 1.245405 |
| 17 | 1.847506 |
| 18 | 2.494028 |
| 19 | 3.140956 |
| 20 | 3.744249 |
| 21 | 4.262833 |
| 22 | 4.661404 |
| 23 | 4.912828 |
| 24 | 4.999987 |

Furthermore, the duration of the drinking interval may alter the volume of the water provided in a given charge. For example, the water supply system 10 may require half as much water per charge if the system 10 will be charged once a day, as opposed to once every two days. Accordingly, the volume of the rack, row, and drinking valve accumulators 118, 216, 408, may be adjusted according to the water distribution needs of the animals. For example, an approximate rack accumulator volume of 1500 ml, with 6 flush and charge cycles per day would be approximately common for a rack 34 containing one-hundred and sixty (160) cages 32 of 5 mice each, where each mouse consumes 7 ml of water per day and additional water spillage is considered. In such an example, the approximate row accumulator 216 volume and drinking valve accumulator 408 volume would be determined based on the number of rows and drinking assemblies per row. For example if the rack 34 had ten (10) rows of sixteen (16) cages 32 per row 40, each row accumulator 216 would require approximately a 150 ml volume, while each drinking valve accumulator 408 would require approximately a 10 ml volume.

More particularly, the charging of the rack assembly may include the following steps:
1) The PRS 18 of the flushing type water supply system 10 checks for any high flow condition with a flow switch or flow sensor when at normal low pressure state of 1-7 psi provided to supply line 14.
2) If no high flow condition is sensed by the PRS 18 flow switch or flow sensor and identified by the ECU 28, the PRS 18 high pressure control valve opens, and the PRS 18 pressure sensor checks that high pressurized water is being supplied with in an acceptable pressure range such as >10 psi.
3) If high water pressure is present in the supply line 14 of the water supply system 10, at the RDS valve 20, then the rack outlet valve 106 opens, followed by the rack inlet valve 104.

4) Water flushes through rack supply system 100 for a given length of time.
5) The rack outlet valve 106 closes.
6) The water entering the rack supply system 100 charges the rack accumulator 118 to pressurize the water therein.
7) After a given time frame such as 20 seconds, the PRS 18 flow sensor signals the flow rate to the ECU 28, with high pressure still supplied to the supply line 14.
8) If the flow rate is above what would be considered normal drinking for the housed animals, then the ECU 28 determines that there is a leak condition on the rack supply system 100, row supply systems 200, 300 or drinking valve assemblies 400. An alarm can be sounded and/or the high pressure control valve on the PRS 18 can be closed to reduce the system down to low pressure in the supply line 14.
9) The water supply system 10 is inspected to identify and repair the faulty drinking valve assembly 400.
10) The watering system 10 is reset such that the rack supply system 100 can be flushed and charged again to ensure that the rack supply system 100 is working correctly and the accumulators 118, 216, 408, are charged.

Similarly, the initial charging of the row assembly 200 may include the following steps:
1) The PRS 18 checks for any high flow condition when at low pressure.
2) If no high flow condition is identified by the ECU 28, the PRS 18 high pressure control valve opens and the PRS 18 pressure sensor checks that high pressure is accurate.
3) If high water pressure is present in the supply line 14 of the water supply system 10, at the RDS valve 20, then the rack outlet valve 106 opens on the rack supply system 100. Water flushes through this rack manifold 102 for a given length of time. For those embodiments of the row inlet and outlet valves 204, 206 that are spring loaded, the water will passively flow through the row. Alternatively, for those embodiments with electrically controlled, i.e. solenoid, row inlet and outlet valves 204, 206, the ECU 28 signals the valves to open and allow water flow.
4) The rack and row outlet valves 106, 206 close.
5) The water entering the rack supply system 100 charges the row accumulators 216 to pressurize the water.
6) After a given time frame such as 20 seconds, the PRS 18 flow sensor signals the flow rate to the ECU 28, with high pressure still on.
7) If the flow level is above what would be considered normal drinking for a few animals, then the ECU 28 determines that there is a leak condition on the rack supply system 100, row supply system 200, or drinking valve assemblies 400. An alarm can be sounded and/or the high pressure control valve on the PRS 18 can be closed to reduce the system pressure down to low pressure in the supply line 14 at the RDS valve 20.
8) The row inlet valves 204 close to isolate the rows 202 from flow of additional water from the rack accumulator 118.
9) The rack supply systems 100 and rows supply systems 200 are inspected to identify the faulty drinking valve assembly 400 and the faulty drinking valve assembly 400 is repaired.
10) The watering system 10 is reset such that the rack supply system 100 and row supply systems 200 can be flushed and charged again to ensure that the rack supply system 100 and row supply systems 200 are working correctly and the rack and row accumulators 118, 216 are charged.

Likewise, the initial charging of the drinking valve assemblies 400 may include the following steps:
1) The PRS 18 checks for any high flow condition when at low pressure.
2) If no high flow condition is identified by the ECU 28, the PRS 18 high pressure control valve opens and the PRS 18 pressure sensor checks that high pressure is accurate.
3) If high water pressure is present in a supply line 14 of the water supply system 10, at the RDS valve 20, then the rack outlet valve 106 opens on the rack supply system 100. Water flushes through this rack manifold 102 and row 202 for a given length of time. For those embodiments of the row inlet and outlet valves 204, 206 that are spring loaded, the water will passively flow through the row 202. For those embodiments with electrically controlled row inlet and outlet valves 204, 206, i.e. solenoid valves, the ECU 28 signals the valves 204, 206 to open and allow water flow. Water flushes through the drinking valve assembly accumulators, 408.
4) The rack and row outlet valves 106, 206 close.
5) The water entering the rack supply system 100 charges the drinking accumulators 408 with pressurized water therein.
6) After a given time frame such as 20 seconds, the PRS 18 flow sensor signals the flow rate to the ECU 28, with high pressure still on.
7) If the flow level is above what would be considered normal drinking for a few animals, then there is a leak condition on the rack supply system 100, row supply system 200 or drinking assemblies 400. An alarm can be sounded, and the high pressure control valve on the PRS 18 is closed to drop the system down to low pressure in the supply line 14.
8) The rack supply systems 100 and rows supply systems 200 are inspected to identify the faulty drinking valve assembly 400 and the faulty drinking valve assembly 400 is repaired.
9) The system 10 is then reset, and at least one flush cycle is effected to make sure that the system 10 is working correctly and all the drinking valve accumulators 408 are charged.

Once the water supply system 10 has been charged, the animals may activate the drinking valve 410 to release the water stored within the valve level accumulator. As the animal triggers the release of water from the valve level accumulator, a fluid sensor, in communication with the valve level accumulator, transmits a signal to the ECU 28, indicating water volume reduction.

As previously mentioned, the water supply system 10 may be flushed with water during an automatic charge or flush cycle. During the charge or flush cycle the drinking valve assembly inlet valve 404, being a pressure-actuated valve, is opened in response to elevated water pressure in the row 202 greater than the water pressure in the valve level accumulator 408. The opening of this valve 404 allows any water remaining in the valve level accumulator 408 prior to the charge/flush cycle to be mixed with incoming fresh water. Once a sufficient volume of water has entered the valve level accumulator 408 the drinking assembly inlet valve 404 closes. The volume of pressurized water in the valve level accumulator 408 is then supplied on-demand to the drinking valve 410.

In an alternative embodiment in which the drinking assembly also includes a drinking assembly outlet valve, the charge and flush cycle requires that the drinking valve be toggled to allow water to flow from the drinking assembly inlet valve 404 to the drinking assembly outlet valve, and fully flush the valve level accumulator 408. Alternatively, if the drinking valve is not toggled, the water provided during the flush and charge cycle will simply mix with any water remaining in the valve level accumulator prior to the flush and charge cycle.

Similarly, the flush and charge cycle recharges the rack accumulator 118 and row accumulator 216 by providing a water pressure upstream of the rack inlet and row inlet valves 104, 204, respectively. This increased pressure causes these valves 104, 204 to open and allow fresh water to enter the rack accumulator 118 and row accumulator 216, respectively. The water simultaneously fills the corresponding manifold 102 and row 202. The respective rack outlet valve 106 and row outlet valves 206 are opened, thereby flushing the charge and flushing water. When the supply of water decreases, the water pressure upstream of the rack outlet and row outlet valves 106, 206 will decrease, causing these valves 106, 206 to close. The closing of the outlet valves 106, 206 will be subsequently followed by the closing of the inlet valves 104, 204, thereby trapping the charged water in the rack accumulator 118 and row accumulator 216 respectively.

Following the flush and charge cycle, all inlet and outlet valves 104, 106, 204, 206 are closed to isolate the controlled volume of water contained within the rack accumulator 118, row accumulator 216 and valve level accumulator 408. Therefore, if a drinking valve 410 becomes compromised by a leak, the supply of water to that drinking valve 410 will be limited to the volume available in the upstream accumulators. Therefore, by limiting the accumulator volume, it is possible to limit the volume to a point below that which would otherwise drown a test animal isolated in a cage. Additionally, if a drinking valve 410 becomes compromised by a leak, as signaled by a fluid sensor, it is possible for the ECU 28 to open the downstream outlet valve 106, 206, and close the upstream inlet valve 104, 204 relative to the compromised drinking valve 410, so as to drain water from the associated row 202 or the associated rack supply system 100, and limit additional water leakage. This same procedure could be performed at the rack level, if warranted by prevailing conditions.

One or more of the outlet valves also could be opened to determine whether water consumption has met expectations. For example, if, prior to initiation to a flush/charge cycle, one would expect the accumulators or other controlled volume dispensers in the system to be empty, one could open the outlet valves in a sequence that drains a section of the system such as one or more rows. Any pressure or volume drop that is observed at that time would indicate that water consumption within that section during the charged portion of the cycle is less than expected, warranting inspection of the valves in that section for potential valve failures or animal health issues.

Another benefit of the system as thus described is that the isolation brought about through valve control and system charging permits the system to supply water to animals for a period of time even in the event of a failure in the water supply system. That period of time is limited only by the capacity of various controlled volume dispensers relative to the expected consumption rates of the housed animals.

Furthermore, the fluid sensor at any given accumulator may be utilized to monitor the volume of water in that accumulator at a given time. As such, over a given duration, it is possible for the ECU 28 to identify the decay rate of the water volume in each accumulator 118, 216, 408 based on the signals received from the sensors. Specifically, the ECU 28 may be programmed to identify an acceptable water pressure or water volume rate of decay, i.e. parameter. If the signal transmitted by the fluid sensor fluctuates beyond the acceptable parameter, the ECU 28 may produce an alarm and/or suspend the automatic charge/flushing cycle until the cause of the nonconforming signal has been identified and corrected.

The logic of the ECU 28 can be programmed to respond to a complete or greater than expected water volume or pressure decay in a given time period. Such an unexpectedly high decay rate would be indicative of a leak in the drinking valve 410, animals drinking more than expected, or some other abnormal condition leading to a higher-than expected consumption level over time. Alternatively, the logic of the ECU 28 can be programmed to respond to a lower than expected volume or pressure decay in a given time period. A lower than expected decay rate would be indicative of insufficient drinking or an inoperable drinking valve 410, animals drinking less than expected, or some other abnormal condition leading to a lower-than expected consumption level over time. In yet another alternative, the logic of the ECU 28 may be programmed to enter a learning period, during which the rate of water volume or pressure decay is recorded as normal water consumption, from which the acceptable parameter is determined.

The signals generated at the fluid sensors associated with each accumulator 118, 216, 408 may also indicate the operational status of the accumulators 118, 216, 408, i.e. charged or not charged, as well as be used to monitor active water consumption by a test animal. Moreover, the electrically controlled valves, as previously discussed, may be controlled by the ECU 28 to increase or decrease the water pressure throughout the system by altering the valve thresholds.

Occasionally, after regular use, the rack 100 may be washed and placed in an autoclave to sterilize the interior surfaces of the system. According, all water must first be drained from the rack supply system 100 by opening the drain valves 128, 114 located in the rack manifold 102 supply line 110 and return line 112, respectively. Pressurized air can be forced through the manifold 102, with all valves 104, 106, 204, 206, 404, and drinking valve stem 436 in the open position, to ensure that all water is removed. After the rack manifold 102 and rows 202 have been drained, the drain valves 114, 128, and 214 are left in the open position. In addition, using unbalanced two-way check valves as check valves and/or placing drinking valve stem 436 in open position allows the system to be autoclaved or high temperature washed with no trapped volume areas for pressure to build up. Subsequently, cleaning fluids may be pumped through the manifold 102, and system may be subjected to an autoclave or otherwise sterilized or additionally cleaned.

Many changes and modifications could be made to the invention without departing from the spirit thereof. The scope of these changes and modifications will become apparent from the appended claims.

The invention claimed is:

1. A water supply system comprising:
  a manifold transporting drinking water therein;
  a rack level controlled volume dispenser, provided in fluid communication with the manifold, for dispensing a designated volume of drinking water;
  a rack inlet valve provided in fluid communication with the manifold and in fluid communication with the rack level controlled volume dispenser;
  a rack outlet valve provided in fluid communication with the manifold and in fluid communication with the rack level controlled volume dispenser;
  a plurality of rows provided within the manifold between the rack level inlet valve and the rack outlet valve and being in fluid communication with the rack level controlled volume dispenser, wherein at least one of the rows comprises a row level controlled volume dispenser for dispensing a designated volume of drinking water that is smaller than that dispensed by the rack level controlled volume dispenser, a row inlet valve in fluid communication with the row level controlled volume dispenser, and a row outlet valve in fluid communication with the row level controlled volume dispenser; and a plurality of drinking valve assemblies, provided in each row, for supplying drinking water to animals.

2. The water supply system of claim 1, further comprising a fluid sensor provided in the at least one row between the row inlet valve and the row outlet valve, the fluid sensor responding to changes in a monitored parameter including at least one of water volume and water pressure within the row.

3. The water supply system of claim 2, further comprising a controller receiving signals from the fluid sensor and generating a signal in response to detected changes in the monitored parameter.

4. The water supply system of claim 1, wherein the row level controlled volume dispenser comprises at least one of an accumulator, a controlled volume delivery pump, and a flow restrictor.

5. A water supply system comprising:

a manifold transporting drinking water therein; a plurality of rows provided within the manifold; a plurality of drinking valve assemblies, provided in each row, for supplying drinking water to animals; a dedicated row level controlled volume dispenser, provided in fluid communication with one of the rows, for dispensing a designated volume of drinking water independently of the dispensing of drinking water to the other rows; a row inlet valve provided in the one row in fluid communication with the row level controlled volume dispenser; and a row outlet valve provided in the one row in fluid communication with the row level controlled volume dispenser.

6. The water supply system of claim 5, further comprising a fluid sensor provided in the one row between the row inlet valve and the row outlet valve, the fluid sensor responding to changes in a monitored parameter including at least one of water volume and water pressure within the manifold.

7. The water supply system of claim 6, further comprising a controller receiving signals from the fluid sensor and generating a signal in response to detected changes in the monitored parameter.

8. The water supply system of claim 5, wherein at least one of the row inlet valve and the row outlet valve is a mechanical check valve.

9. The water supply system of claim 5, wherein at least one of the row inlet valve and the row outlet valve is an electrically activated valve.

10. The water supply system of claim 5, wherein the row level controlled volume dispenser comprises at least one of an accumulator, a controlled volume dispensing pump, and a flow restrictor.

11. The water supply system of claim 10, wherein at least one of the row inlet valve and the row outlet valve is integrated into the controlled volume dispensing pump.

12. The water supply system of claim 10, wherein the row level controlled volume dispenser comprises an accumulator including a housing having one of a gas filled bag and a resilient bladder disposed therein.

13. The water supply system of claim 10, wherein the row level controlled volume dispenser comprises an accumulator comprising a housing having a plurality of discrete gas filled compartments disposed therein.

14. The water supply system of claim 10, wherein the row level controlled volume dispenser comprises an accumulator comprising a housing having an elastic tube disposed therein.

15. The water supply system of claim 5, further comprising a rack level controlled volume dispenser, provided in fluid communication with the manifold upstream of an upstream-most row control valve, for dispensing a designated volume of drinking water that is higher than that dispensed by the row level controlled volume dispenser, a rack inlet valve provided in fluid communication with the manifold and with the rack level controlled volume dispenser, and a rack outlet valve provided in fluid communication with the manifold and with a downstream-most row outlet valve.

16. The water supply system of claim 5, wherein each drinking valve assembly further comprises a valve level controlled volume dispenser delivering a designated volume of drinking water to the associated animal watering valve that is lower than the volume dispensed by the row level controlled volume dispenser.

* * * * *